United States Patent
Manian et al.

(10) Patent No.: US 12,476,778 B2
(45) Date of Patent: Nov. 18, 2025

(54) RECEIVER WITH PRE-CURSOR INTERSYMBOL INTERFERENCE MITIGATION

(71) Applicant: TEXAS INSTRUMENTS INCORPORATED, Dallas, TX (US)

(72) Inventors: Abishek Manian, San Jose, CA (US); Ashkan Roshan Zamir, San Jose, CA (US); Yonghui Tang, Plano, TX (US); Robin Gupta, Santa Clara, CA (US); Michael G. Vrazel, Chamblee, GA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

(21) Appl. No.: 18/309,587

(22) Filed: Apr. 28, 2023

(65) Prior Publication Data

US 2024/0137198 A1 Apr. 25, 2024
US 2024/0235804 A9 Jul. 11, 2024

Related U.S. Application Data

(60) Provisional application No. 63/417,341, filed on Oct. 19, 2022.

(51) Int. Cl.
| | | |
|---|---|---|
| *H03D 1/06* | (2006.01) | |
| *H03D 11/08* | (2006.01) | |
| *H03K 5/01* | (2006.01) | |
| *H03K 6/04* | (2006.01) | |
| *H04B 1/10* | (2006.01) | |
| *H04L 1/00* | (2006.01) | |
| *H04L 7/00* | (2006.01) | |
| *H04L 25/03* | (2006.01) | |
| *H04L 25/08* | (2006.01) | |

(52) U.S. Cl.
CPC ...... *H04L 7/0016* (2013.01); *H04L 25/03012* (2013.01)

(58) Field of Classification Search
CPC .. H04L 7/0016; H04L 25/03012; H04L 7/0058
USPC ........ 375/348, 350, 229, 232, 373, 375, 376
See application file for complete search history.

(56) References Cited

U.S. PATENT DOCUMENTS

2010/0135378 A1* 6/2010 Lin ................... H04L 7/0058
375/232

\* cited by examiner

*Primary Examiner* — Phuong Phu
(74) *Attorney, Agent, or Firm* — Mandy Barsilai Fernandez; Frank D. Cimino

(57) ABSTRACT

A receiver includes: equalizer circuitry; clock and data recovery (CDR) circuitry; sampler circuitry; adaptation circuitry; and clock adjustment circuitry. The receiver is configured to: receive data via a channel; perform equalization operations on received data, the equalization operations resulting in equalization results; perform sampling operations responsive to the equalization results, the sampling operations resulting in data samples and error samples; perform adaptation operations responsive to the data samples and the error samples, the adaptation operations resulting in a clock adjustment control signal; and adjust a sampling clock signal relative to a CDR clock signal responsive to the clock adjustment control signal.

8 Claims, 12 Drawing Sheets

RECEIVER WITH PRE-CURSOR INTERSYMBOL INTERFERENCE MITIGATION

CROSS REFERENCE TO RELATED APPLICATION

The present application is related to: U.S. Provisional Application No. 63/417,341, titled "Pre-Cursor ISI Mitigation using Clock Shifting", filed on Oct. 19, 2022, which is hereby incorporated by reference in its entirety.

BACKGROUND

In high-speed wireline systems with lossy media (e.g., cables), pre-cursor and post-cursor intersymbol interference (ISI) degrades signal integrity. While continuous-time linear equalizer (CTLE) and decision-feedback equalizer (DFE) techniques can reduce or cancel post-cursor ISI, these techniques are not effective against pre-cursor ISI. A transmitter-side finite impulse response (FIR) is one option to mitigate pre-cursor ISI, but some communication standards do not permit this option. Another option to mitigate pre-cursor ISI is a receiver-side feed-forward equalizer (FFE), but this option results in an undesirable noise penalty.

SUMMARY

In an example, a receiver includes: equalizer circuitry; clock and data recovery (CDR) circuitry; sampler circuitry; adaptation circuitry; and clock adjustment circuitry. The equalizer circuitry has a first input, a second input, and an output. The CDR circuitry has a first input, a second input, and a clock output. The sampler circuitry has a first input, a second input, and an output. The adaptation circuitry has a first input, a second input, a third input, a first output, a second output, and a third output. The first input of the adaptation circuitry is coupled to the output of the CDR circuitry. The second input of the adaptation circuitry is coupled to the output of the sampler circuitry. The third input of the adaptation circuitry is coupled to the output of the equalizer circuitry. The first output of the adaptation circuitry is coupled to the second input of the equalizer circuitry. The second output of the adaptation circuitry is coupled to the first input of the CDR circuitry and the first input of the sampler circuitry. The clock adjustment circuitry has a first input, a second input, and an output. The first input of the clock adjustment circuitry is coupled to the third output of the adaptation circuitry. The second input of the clock adjustment circuitry is coupled to the clock output of the CDR circuitry. The output of the clock adjustment circuitry is coupled to the second input of the CDR circuitry or the second input of the sampler circuitry.

In another example, a system includes: a transmitter; and a receiver in communication with the transmitter via a channel. The receiver includes: equalizer circuitry; CDR circuitry; sampler circuitry; adaptation circuitry; and clock adjustment circuitry. The equalizer circuitry has a first input, a second input, and an output. The CDR circuitry has a first input, a second input, and a clock output. The sampler circuitry has a first input, a second input, and an output. The adaptation circuitry has a first input, a second input, a third input, a first output, a second output, and a third output. The first input of the adaptation circuitry is coupled to the output of the CDR circuitry. The second input of the adaptation circuitry is coupled to the output of the sampler circuitry. The third input of the adaptation circuitry is coupled to the output of the equalizer circuitry. The first output of the adaptation circuitry is coupled to the second input of the equalizer circuitry. The second output of the adaptation circuitry is coupled to the first input of the CDR circuitry and the first input of the sampler circuitry. The clock adjustment circuitry has a first input, a second input, and an output. The first input of the clock adjustment circuitry is coupled to the third output of the adaptation circuitry. The second input of the clock adjustment circuitry is coupled to the clock output of the CDR circuitry. The output of the clock adjustment circuitry is coupled to the second input of the CDR circuitry or the second input of the sampler circuitry.

In yet another example, a method includes: receiving data via a channel; performing equalization operations on received data, the equalization operations resulting in first equalized data; performing sampling operations responsive to the first equalized data and second equalized data, the sampling operations resulting in data samples and error samples; performing adaptation operations responsive to the first equalized data, the data samples, and the error samples, the adaptation operations resulting in a clock adjustment control signal and the second equalized data; providing a CDR clock signal responsive to the second equalized data; and adjusting a sampling clock signal relative to the CDR clock signal responsive to the clock adjustment control signal.

DETAILED DESCRIPTION

Figure 1:
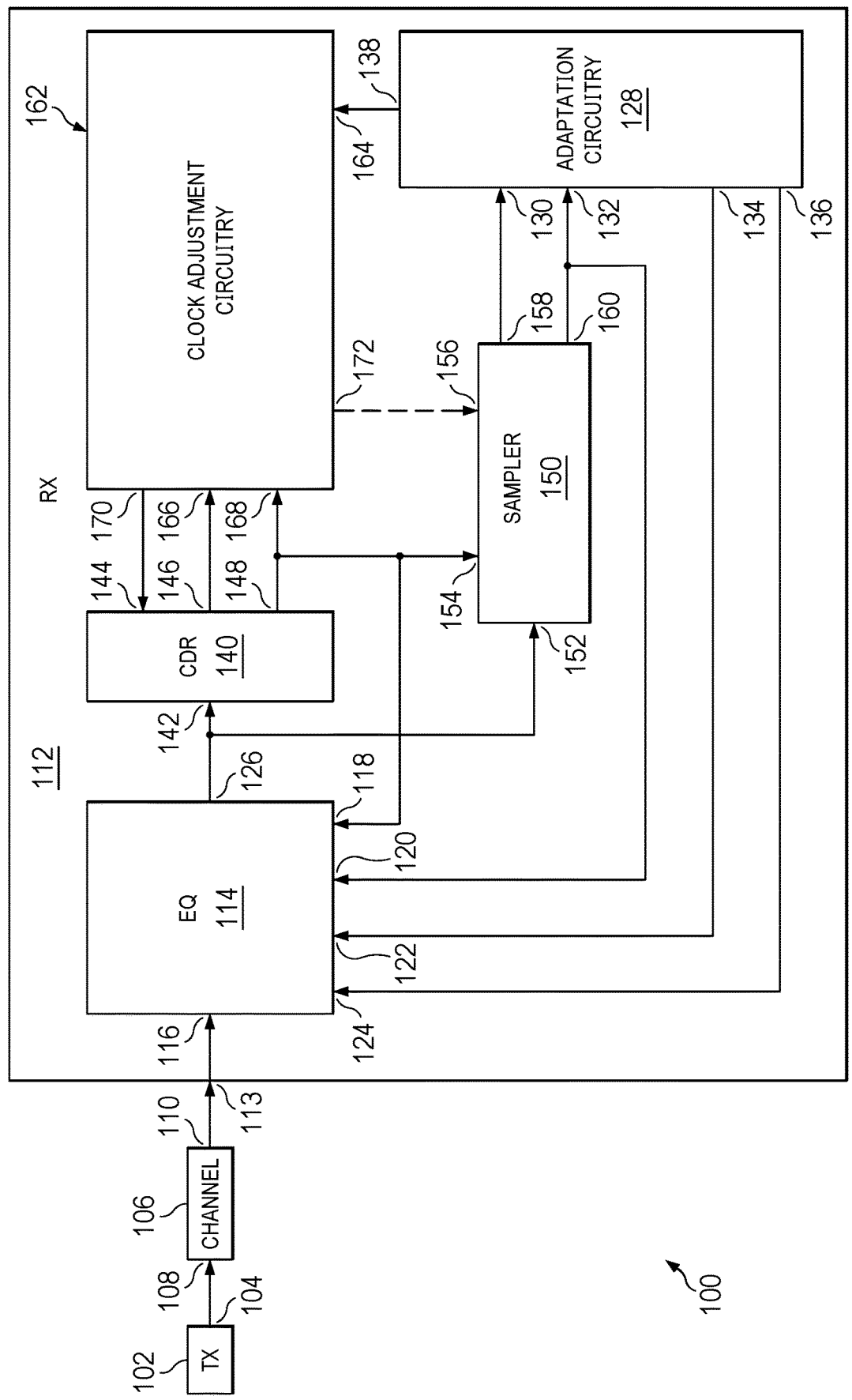
FIG. 1 is a diagram showing an example system.

The same reference numbers or other reference designators are used in the drawings to designate the same or similar features. Such features may be the same or similar either by function and/or structure.

Described herein are receivers with clock adjustment circuitry and related circuits and systems. The clock adjustment circuitry adjusts a clock and data recovery (CDR) clock signal relative to a sampling clock signal. In some examples, the operations of the clock adjustment circuitry delay the CDR clock signal so that the CDR clock signal is delayed related to the sampling clock signal. As another option, the operations of the clock adjustment circuitry delay both the CDR clock signal and the sampling clock signal, where the CDR clock signal is delayed more than the sampling clock signal. As another option, a voltage level of the sampling clock signal is adjusted to shift the phase of the sampling clock signal relative to the phase of the CDR clock signal. As desired, the operations of the clock adjustment circuitry may combine clock signal delay options and clock signal voltage adjustment options to adjust a CDR clock signal relative to a sampling clock signal. In some examples, the operations of the clock adjustment circuitry adjust a CDR clock signal relative to a sampling clock signal to mitigate pre-cursor inter-symbol interference (ISI).

FIG. 1 is a diagram showing an example system 100. As shown, the system 100 includes a transmitter 102, a channel 106, and a receiver 112. The transmitter 102 has an output 104. The channel 106 has an input 108 and an output 110. In some examples, the channel 106 is a wired channel. The receiver 112 has an input 113.

In the example of FIG. 1, the receiver includes equalizer circuitry 114, CDR circuitry 140, sampler circuitry 150, adaptation circuitry 128, and clock adjustment circuitry 162. The equalizer circuitry 114 has a first input 116, a second input 118, a third input 120, a fourth input 122, a fifth input 124, and an output 126. The CDR circuitry 140 has a first input 142, a second input 144, a first output 146, and a second output 148. The sampler circuitry 150 has a first input 152, a second input 154, a third input 156, a first output 158, and a second output 160. In some examples, the third input 156 is omitted. The adaptation circuitry 128 has a first input 130, a second input 132, a first output 134, a second output 136, and a third output 138. The clock adjustment circuitry 162 has a first input 164, a second input 166, a third input 168, a first output 170 and a second output 172. In some examples, the first output 170 is omitted and the second output 172 is included. In other examples, the first output 170 is included and the second output 172 is omitted.

In the example of FIG. 1, the first input 116 of the equalizer circuitry 114 is coupled to the input 113 of the receiver 112. The second input 118 of the equalizer circuitry 114 is coupled to the second output 148 of the CDR circuitry 140. The third input 120 of the equalizer circuitry 114 is coupled to the second output 160 of the sampler circuitry 150. The fourth input 122 of the equalizer circuitry 114 is coupled to the first output 134 of the adaptation circuitry 128. The fifth input 124 of the equalizer circuitry 114 is coupled to the second output 136 of the adaptation circuitry 128. The output 126 of the of the equalizer circuitry 114 is coupled to the first input 142 of the CDR circuitry 140 and to the first input 152 of the sampler circuitry 150. Without limitation, the equalizer circuitry 114 may include continuous-time linear equalizer (CTLE) circuitry, decision feedback equalizer (DFE) circuitry, combine circuitry, and/or other equalizer circuitry.

The second input 144 of the CDR circuitry 140 is coupled to the first output 170 of the clock adjustment circuitry 162. The first output 146 of the CDR circuitry 140 is coupled to the second input 166 of the clock adjustment circuitry 162. The second output 148 of the CDR circuitry 140 is coupled to the third input 168 of the clock adjustment circuitry 162.

The third input 156 of the sampler circuitry 150 is coupled to the second output of the clock adjustment circuitry 162. The first output 158 of the sampler circuitry 150 is coupled to the first input 130 of the adaptation circuitry 128. The second output 160 of the sampler circuitry 150 is coupled to the second input 132 of the adaptation circuitry 128. The third output 138 of the adaptation circuitry 128 is coupled to the first input 164 of the clock adjustment circuitry 162.

In some examples, the equalizer circuitry 114 operates to: receive data from the channel at its first input 116; receive a sampling clock signal from the CDR circuitry 140 at its second input 118; receive data samples from the sampler circuitry 150 at its third input 120; receive CTLE index results from the adaptation circuitry 128 at its fourth input 122; receive DFE coefficient(s) from the adaptation circuitry 128 at its fifth input 124; and provide equalization results at its output 126 responsive to the received data, the sampling clock signal, the data samples, the CTLE index results, and the DFE coefficient(s).

In some examples, the CDR circuitry 140 operates to: receive equalization results from the equalizer circuitry 114 at its first input 142; receive an adjusted clock signal, e.g., an adjusted CDR clock signal, from the clock adjustment circuitry 162 at its second input 144; generate first and second (CDR) clock signals responsive to the equalization results and, in some instances, according to the adjusted clock signal; provide the first CDR clock signal at its first output 146; and provide the second CDR clock signal at its second output 148.

In some examples, the sampler circuitry 150 operates to: receive equalization results from the equalizer circuitry 114 at its first input 152; receive a CDR clock signal from the CDR circuitry 140 at its second input 154 or receive the adjusted clock signal from the clock adjustment circuitry 162 at its third input 156; provide error samples at its first output 158 responsive to the equalization results and responsive to the CDR clock signal or the adjusted clock signal; and provide data samples at its second output 160 responsive to the equalization results and responsive to the CDR clock signal or the adjusted clock signal.

In some examples, the adaptation circuitry 128 operates to: receive error samples from the sampler circuitry 150 at its first input 130; receive data samples from the sampler circuitry 150 at its second input 132; provide CTLE index results at its first output 134 responsive to the error samples and the data samples; provide DFE coefficient(s) at its second output 136 responsive to the error samples and the data samples; and provide a clock adjustment control signal at its third output 138 responsive to the error samples and the data samples.

In some examples, the clock adjustment circuitry 162 operates to: receive a clock adjustment control signal from the adaptation circuitry 128 at its first input 164; receive a first CDR clock signal at its second input 166; receive a second CDR clock signal at its third input 168; provide an adjusted CDR clock signal at its first output 170 responsive to the clock adjustment control signal and the first and/or second CDR clock signals. In some examples, the adjusted clock signal is a first adjusted clock signal, and the clock adjustment circuitry 162 operates to provide a second adjusted clock signal at its second output 172 responsive to the clock adjustment control signal and the first and/or second CDR clock signals. In some examples, the first adjusted clock signal at the first output 170 and/or the second adjusted clock signal at the second output 172 are used to mitigate pre-cursor ISI.

In some examples, the system 100 uses a 2-level modulation scheme or a multi-level modulation scheme for communications between the transmitter 102 and the receiver 112. An example 2-level modulation scheme is a non-return-to-zero (NRZ) modulation scheme. An example multi-level modulation scheme is a pulse-amplitude modulation (PAM-N) modulation scheme.

Figure 2A:
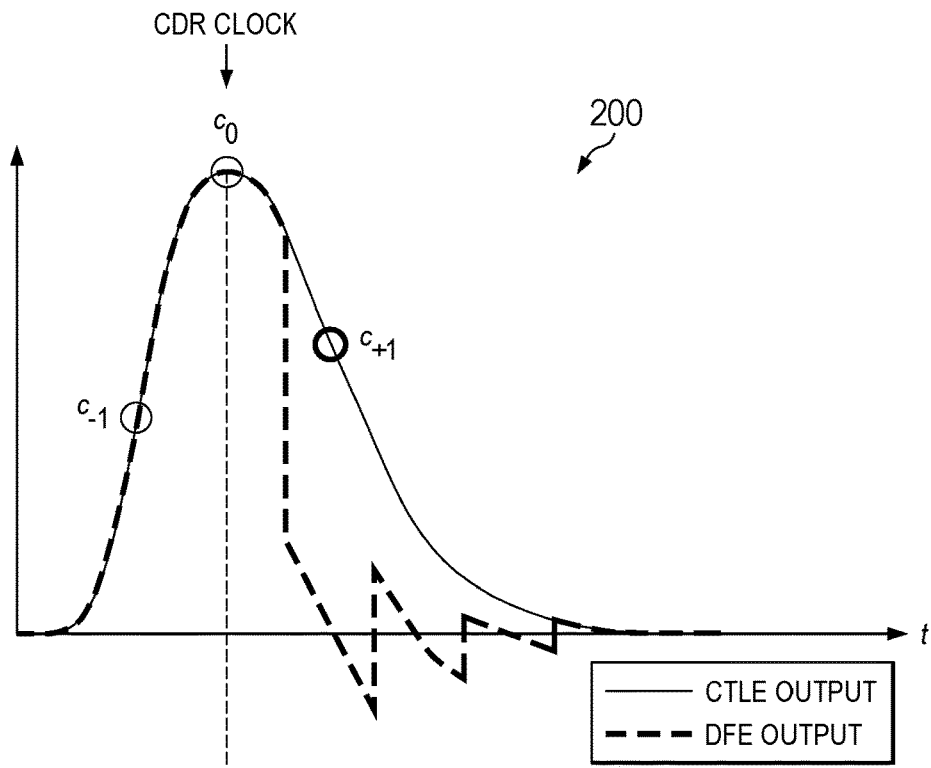
FIG. 2a is a graph showing example receiver signals in which a clock and data recovery (CDR) clock signal is aligned with a sampling clock signal.

FIG. 2a is an example graph 200 showing a single-bit pulse response of a receiver, in which a CDR clock (also referred to herein as a CDR clock signal) is aligned with a sampling clock (also referred to herein as a sampling clock signal). The CDR clock signal is generated by CDR circuitry. The sampling clock signal is provided by the CDR circuitry to sampler circuitry. The example receiver includes equalizer circuitry that includes both CTLE circuitry and DFE circuitry. Accordingly, in the graph 200, the receiver signals include a CTLE output signal (pulse) and a DFE output signal (pulse) as a function of time.

The graph 200 also shows a CDR clock position and voltage $c_{-1}$, $c_0$, and $c_{+1}$ (sometimes referred to as "terms" herein) at respective sampling points. The voltage $c_0$ is called the main cursor and is the desired voltage caused by the current but at the current sample point. The voltage $c_{-1}$ is an undesired voltage caused by the current bit at the previous sample point due to pre-cursor ISI between bit N and bit N−1. The voltage $c_{+1}$ is an undesired voltage caused by the current bit at the next sample point due to post-cursor ISI between bit N and bit N+1. In some examples, DFE is used to zero additional post-cursor terms (e.g., $c_{+2}$, $c_{+3}$, and so on). For error-free reception of the data signal, the sum of all the pre-cursor and post-cursor ISI terms is much lower than the main cursor. In the graph 200, the current sampling point for the voltage $c_0$ is aligned with the CDR clock signal. As shown, the CTLE output signal and the DFE output signal are the same before the current sampling point, indicating that the pre-cursor ISI is not mitigated by the DFE. After the current sampling point, the DFE output signal drops quickly compared to the CTLE output signal, thus forcing the post-cursor ISI term to zero and, thereby, canceling the post-cursor ISI term.

Figure 2B:
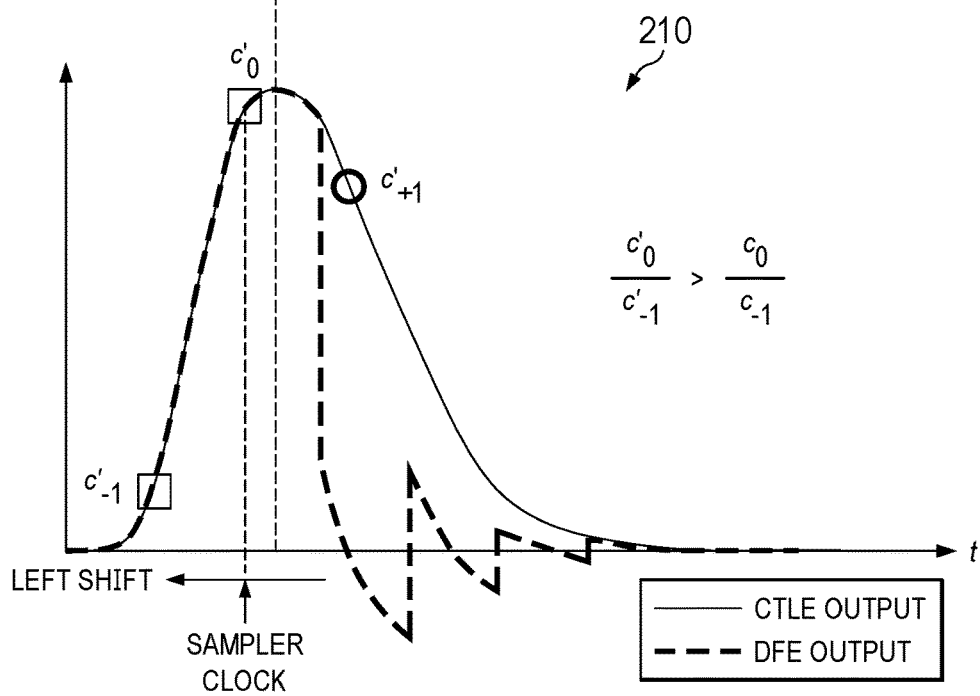
FIG. 2b is a graph showing example receiver signals in which the CDR clock signal is delayed relative to the sampling clock signal.

FIG. 2b is a graph 210 showing receiver signals in which the CDR clock signal and the sampling clock signal are not aligned, in that there is a relative delay between the clock signals. For example, the CDR clock signal is delayed relative to the sampling clock signal, which is represented as the sampling clock signal being shifted to the left of the CDR clock signal. In the graph 210, the receiver signals again include the CTLE output signal and the DFE output signal described for the graph 200.

The graph 210 also shows a CDR clock position and voltages $c'_{-1}$, $c'_0$, and $c'_{+1}$ at respective sampling points. The voltage $c'_0$ is the main cursor and is the desired voltage caused by the current but at the current sample point. The voltage $c'_{+1}$ is an undesired voltage caused by the current bit at the next sample point due to post-cursor ISI between bit N and bit N+1. The voltage $c'_{-1}$ is an undesired voltage caused by the current bit at the previous sample point due to pre-cursor ISI between bit N and bit N−1. In the graph 210, the sampling points for the voltages $c'_{-1}$, $c'_0$, and $c'_{+1}$ are shifted to the left relative to the sampling points represented in graph 200. With the sampling points for the voltages $c'_{-1}$, $c'_0$, and $c'_{+1}$ shifted to the left, the voltage $c'_0$ relative to the voltage $c_0$ is reduced slightly, the voltage $c'_{-1}$ relative to the voltage $c_{-1}$ is greatly reduced, and the voltage $c'_{+1}$ relative to the voltage $c_{+1}$ is slightly increased. As shown, the voltage $c'_{+1}$ for the DFE output is forced to zero, thus canceling post-cursor ISI. By selectively adjusting the position of the sampling clock signal and/or the position of the CDR clock as described herein, the sampled voltage values can reduce pre-cursor ISI without significantly affecting post-cursor ISI handling.

In some examples, the CTLE output shown in graphs 200 and 210 is the same as the DFE input. The DFE tap works on post-cursor ISI term $c_{+1}$ as well as additional post-cursor ISI term $c_{+2}$ and $c_{+3}$ (not specifically shown in FIGS. 2a and 2b). DFE taps are adjusted such that the post-cursor ISI terms are forced to zero in the pulse response at the DFE output. As shown in FIGS. 2a and 2b, DFE does not affect the pre-cursor ISI term $c_{-1}$, or the main cursor term $c_0$.

Figure 3:
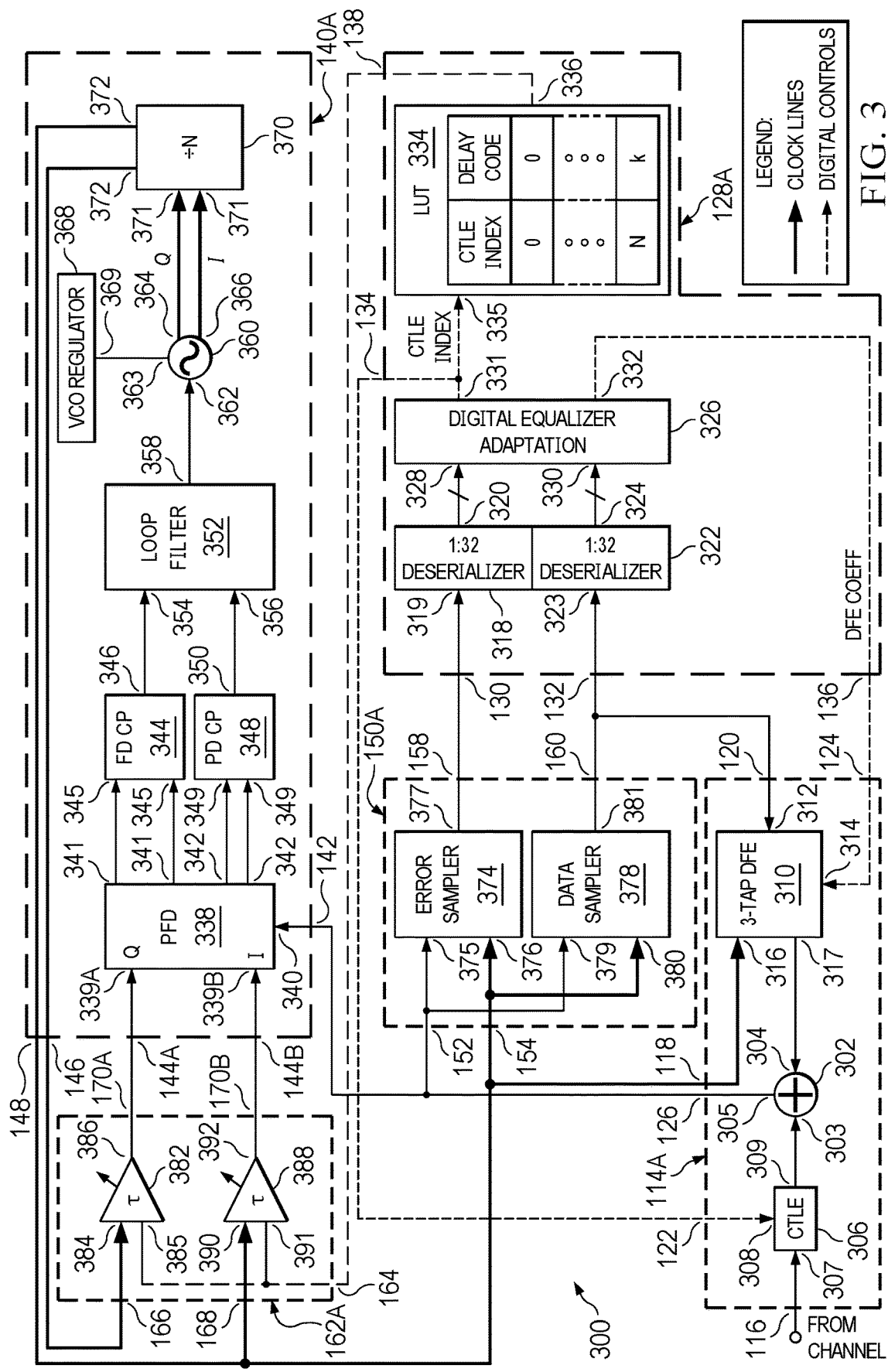
FIGS. 3-6 are block diagrams showing example receivers.

FIGS. 3-6 are block diagrams respectively illustrating example receivers 300, 400, 500, and 600. In the example of FIG. 3, the receiver 300 includes equalizer circuitry 114A, CDR circuitry 140A, sampler circuitry 150A, adaptation circuitry 128A, and clock adjustment circuitry 162A. The equalizer circuitry 114A is an example of the equalizer circuitry 114. The CDR circuitry 140A is an example of the CDR circuitry 140. The sampler circuitry 150A is an example of the sampler circuitry 150. The adaptation circuitry 128A is an example of the adaptation circuitry 128. The clock adjustment circuitry 162A is an example of the clock adjustment circuitry 162.

The equalizer circuitry 114A has the first input 116, the second input 118, the third input 120, the fourth input 122, the fifth input 124, and the output 126 described in FIG. 1. The CDR circuitry 140A has the first input 142, the first output 146, and the second output 148 described in FIG. 1. The CDR circuitry 140A also has a second input 144A and a third input 144B, which are examples of the second input 144 in FIG. 1. The sampler circuitry 150A has the first input 152, the second input 154, the first output 158, and the second output 160 described in FIG. 1. The adaptation circuitry 128A has the first input 130, the second input 132, the first output 134, the second output 136, and the third output 138 described in FIG. 1. The clock adjustment circuitry 162A has the first input 164, the second input 166, and the third input 168 described in FIG. 1. In the example of FIG. 3, the clock adjustment circuitry 162A has a first output 170A and a second output 170B. The first output 170A and the second output 170B are examples of the first output 170 in FIG. 1.

As illustrated, the equalizer circuitry 114A includes a combine circuit 302, a CTLE circuit 306, and a DFE circuit 310. The combine circuit has a first input 303, a second input 304, and an output 305. The CTLE circuit 306 has a first input 307, a second input 308, and an output 309. The DFE circuit 310 has a first input 312, a second input 314, a third input 316, and an output 317. In some examples, the DFE circuit 310 is 3-tap DFE circuit used to cancel three post-cursor ISI terms (e.g., terms $c_{+1}$, $c_{+2}$ and $c_{+3}$).

As illustrated, the CDR circuitry 140A includes a phase and frequency detector (PFD) 338, a frequency detector charge pump (FD CP) 344, a phase detector charge pump (PD CP) 348, a loop filter 352, a voltage-controlled oscillator (VCO) 360, a VCO regulator 368, and a divider 370. In the example of FIG. 3, the PFD 338 has a first input 339A, a second input 339B, a third input 340, first outputs 341, and second outputs 342. The frequency detector charge pump 344 has inputs 345 and an output 346. The phase detector charge pump 348 has inputs 349 and an output 350. The loop filter 352 has a first input 354, a second input 356, and an output 358. The VCO 360 has a first input 362, a second input 363, a first output 364, and a second output 366. The VCO regulator 368 has an output 369. The divider 370 has includes inputs 371 and outputs 372.

As illustrated, the sampler circuitry 150A includes an error sampler 374 and a data sampler 378. In the example of FIG. 3, the error sampler 374 has a first input 375, a second input 376, and an output 377. The data sampler 378 has a first input 379, a second input 380, and an output 381.

As illustrated, the adaptation circuitry 128A includes a first deserializer 318, a second deserializer 322, a digital equalizer adaptation circuit 326, and a clock adjustment controller 334. Although logically shown as part of the adaptation circuitry, the clock adjustment controller can be logically part of the clock adjustment circuitry. The first deserializer 318 has an input 319 and outputs 320. In some examples, the first deserializer 318 is a 1:32 (one input to 32 parallel outputs) deserializer. The second deserializer 322 has an input 323 and outputs 324. In some examples, the second deserializer 322 is a 1:32 deserializer. The digital equalizer adaptation circuit 326 has first inputs 328, second inputs 330, a first output 331, and a second output 332. The clock adjustment controller 334 has an input 335 and an output 336.

As illustrated, the clock adjustment circuitry 162A includes a first delay circuit 382 and a second delay circuit 388. The first delay circuit 382 has a first input 384, a second input 385, and an output 386. The second delay circuit 388 has a first input 390, a second input 391, and an output 392.

In the example of FIG. 3, the first input 307 of the CTLE circuit 306 is coupled to the first input 116 of the equalizer circuitry 114A. The second input of the CTLE circuit 306 is coupled to the fourth input 122 of the equalizer circuitry 114A. The output 309 of the CTLE circuit 306 is coupled to the first input 303 of the combine circuit 302. The first input 312 of the DFE circuit 310 is coupled to the third input 120 of the equalizer circuitry 114A. The second input 314 of the DFE circuit 310 is coupled to the fifth input 124 of the equalizer circuitry 114A. The third input 316 of the DFE circuit 310 is coupled to the second input 118 of the equalizer circuitry 114A. The output 317 of the DFE circuit 310 is coupled to the second input 304 of the combine circuit 302. The output 305 of the combine circuit 302 is coupled to the output 126 of the equalizer circuitry 114A.

In the example of FIG. 3, the first input 339A of the PFD 338 is coupled to the second input 144A of the CDR circuitry 140A. The second input 339B of the PFD 338 is coupled to the third input 144B of the CDR circuitry 140A. The third input 340 of the PFD 338 is coupled to the first input 142 of the CDR circuitry 140A. The first outputs 341 of the PFD 338 are coupled to the inputs 345 of the frequency detector charge pump 344. The second outputs 342 of the PFD 338 are coupled to the inputs 349 of the phase detector charge pump 348. The output 346 of the frequency detector charge pump 344 is coupled to the first input 354 of the loop filter 352. The output 350 of the phase detector charge pump 348 is coupled to the second input 356 of the loop filter 352. The output of the loop filter 352 is coupled to the first input 362 of the VCO 360. The second input 363 is coupled to the output 369 of the VCO regulator 368. The first output 364 of the VCO 360 is coupled to the inputs 371 of the divider 370. The second output 366 of the VCO 360 is also coupled to the inputs 371 of the divider 370. The outputs 372 of the divider 370 are coupled to the first output 146 of the CDR circuitry 140A. The outputs 372 of the divider 370 are coupled to the first output 146 and the second output 148 of the CDR circuitry 140A.

As illustrated, the first input 375 of the error sampler 374 is coupled to the first input 152 of the sampler circuitry 150A. The second input 376 of the error sampler 374 is coupled to the second input 154 of the sampler circuitry 150A. The output 377 of the error sampler 374 is coupled to the first output 158 of the sampler circuitry 150A. The first input 379 of the data sampler 378 is coupled to the first input 152 of the sampler circuitry 150A. The second input 380 of the data sampler 378 is coupled to the second input 154 of the sampler circuitry 150A. The output 381 of the data sampler 378 is coupled to the second output 160 of the sampler circuitry 150A.

The input 319 of the first deserializer 318 is coupled to the first input 130 of the adaptation circuitry 128A. The outputs 320 of the first deserializer 318 are coupled to the first inputs 328 of the digital equalizer adaptation circuit 326. The input 323 of the second deserializer 322 is coupled to the second input 132 of the adaptation circuitry 128A. The outputs 324 of the second deserializer 322 are coupled to the second inputs 330 of the digital equalizer adaptation circuit 326. The first output 331 of the digital equalizer adaptation circuit 326 is coupled to the first output 134 of the adaptation circuitry 128A. The second output 332 of the digital equalizer adaptation circuit 326 is coupled to the second output 136 of the adaptation circuitry 128A. The first output 331 of the digital equalizer adaptation circuit 326 is also coupled to the input 335 of the clock adjustment controller 334. The output 336 of the clock adjustment controller 334 is coupled to the third output 138 of the adaptation circuitry 128A.

The first input 384 of the first delay circuit 382 is coupled to the second input 166 of the clock adjustment circuitry 162A. The second input 385 of the first delay circuit 382 is coupled to the first input 164 of the clock adjustment circuitry 162A. The output 386 of the first delay circuit 382 is coupled to the first output 170A of the clock adjustment circuitry 162A. The first input 390 of the second delay circuit 388 is coupled to the third input 168 of the clock adjustment circuitry 162A. The second input 391 of the second delay circuit 388 is coupled to the first input 164 of the clock adjustment circuitry 162A. The output 392 of the second delay circuit 388 is coupled to the second output 170B of the clock adjustment circuitry 162A.

In some examples, the receiver 300 operates to: receive data via a channel such as the channel 106 in FIG. 1; perform equalization operations on the received data, the equalization operations resulting in equalized data; perform sampling operations responsive to or on the equalized data, the sampling operations resulting in error samples and data samples; perform adaptation operations responsive to the error samples and the data samples, the adaptation operations resulting in a clock adjustment control signal, CTLE index results, and DFE coefficient(s); provide a CDR clock signal and a sampling clock signal responsive to the equalized data and input clock signal(s); and adjust the CDR clock signal and/or the sampling clock signal responsive to the clock adjustment control signal.

More specifically, the equalizer circuitry 114A operates to: receive data from the channel at its first input 116; receive a sampling clock signal from the CDR circuitry 140A at its second input 118; receive data samples from the sampler circuitry 150A at its third input 120; receive CTLE index results from the adaptation circuitry 128A at its fourth input 122; receive DFE coefficient(s) from the adaptation circuitry 128A at its fifth input 124; and provide equalization results at its output 126 responsive to the received data from the channel; the sampling clock signal; the data samples; the CTLE index results; and DFE coefficient(s). In this example, the equalization results include equalized or filtered data with mitigated pre-cursor and post-cursor ISI resulting from implementing the described teachings.

The CDR circuitry 140A operates to: receive the equalization results from the equalizer circuitry 114A at its first input 142; receive adjusted clock signals from the clock adjustment circuitry 162A at its second input 144A and third input 144B; provide a first CDR clock signal at its first output 146 responsive to the equalization results and the adjusted clock signal; and provide a second CDR clock signal at its second output 148 responsive to the equalization results (e.g., the equalized data) and the adjusted clock signal. For example, the CDR circuitry 140A performs clock recovery from the equalized data, resulting in recovered CDR clock signals (e.g., the I and Q clock signals herein) at the outputs 372 of the divider 370. The recovered CDR clock signals are time shifted by the clock adjustment circuitry 162A based on the described teachings.

The sampler circuitry 150A operates to: receive equalization results (e.g., the equalized data) from the equalizer circuitry 114A at its first input 152; receive a sampling clock signal from the CDR circuitry 140A at its second input 154; provide error samples at its first output 158 responsive to the equalization results and the CDR clock signal; and provide data samples at its second output 160 responsive to the equalization results and the sampling clock signal.

The adaptation circuitry 128A operates to: receive error samples from the sampler circuitry 150A at its first input 130; receive data samples from the sampler circuitry 150A at its second input 132; provide CTLE index results at its first output 134 responsive to the error samples and the data samples; provide DFE coefficient(s) at its second output 136 responsive to the error samples and the data samples; provide a clock adjustment control signal at its third output 138 responsive to the error samples and the data samples.

The clock adjustment circuitry 162A operates to: receive a clock adjustment control signal from the adaptation circuitry 122A at its first input 164; receive a first CDR clock signal at its second input 166; receive a second CDR clock signal at its third input 168; provide an first adjusted clock signal at its first output 170A responsive to the first CDR clock signal and the clock adjustment control signal; and provide a second adjusted clock signal at its second output 1708 responsive to the second CDR clock signal and the clock adjustment control signal. With the first adjusted clock signal at the first output 170A and/or the second adjusted clock signal at the second output 170B, the receiver 300 can mitigate pre-cursor ISI using the described teachings.

In some examples, the PFD 338 of the CDR circuitry 140A operates to: receive a Q clock signal received at its first input 339A; receive an I clock signal at its second input 339B; provide frequency information of the equalized data at the first outputs 341 responsive to the received Q and I clock signals; and provide phase information of the equalized data at the second outputs 342 responsive to the received Q and I clock signals. The frequency detector charge pump 344 operates to: receive frequency information from the PFD 338 at its inputs 345; and provide a charge at its output 346 responsive to the received frequency information. The phase detector charge pump 348 operates to: receive phase information from the PFD 338 at its inputs 349; and provide a charge at its output 350 responsive to the received phase information. The loop filter 352 operates to: receive charge from the frequency detector charge pump 344 at its first input 354; receive charge from the phase detector charge pump 348 at its second input 356; and provide a control voltage at its output 358 responsive to the received charges. In an example, the control voltage is representative of the phase and frequency information of the equalized data.

The VCO 360 operates to: receive the control voltage from the loop filter 352 at its first input 362; receive a supply voltage from the VCO regulator 368 at its second input 363; provide a Q clock signal at its first output 364 responsive to the control voltage and the supply voltage; and provide an I clock signal at its second output 366 responsive to the control voltage and the supply voltage. The divider 370 operates to: receive the Q and I clock signals at its inputs 371; and provide divider results at its outputs 372 responsive received Q and I clock signals and a divider integer setting N of the divider 370. In different examples, the value of N varies. In some examples, the VCO 360 may provide a single clock signal to the divider 370. In such examples the divider 370 may generate I and Q clock phases. Moreover, the divider results at the outputs 372 represent a CDR clock signal derived from the equalized data. In the present examples, the clock signal from one of the outputs 372 is provided to the sampling circuitry 150A as the sampling clock signal. Additionally, in the present example, the CDR clock signal at outputs 372 of the divider 370 is delayed by the clock adjustment circuitry 162A relative to the sampling clock signal.

The CDR circuitry 140A in FIG. 3 is an example of a full-rate CDR that uses I and Q clocks. The I clock or in-phase clock is usually aligned to the middle of the data bit. Accordingly, the I clock may be used to sample data for the sampler circuitry 150A (perhaps with some clock shifting as described herein). The I clock is also used to generate phase information for the CDR clock signal (e.g., the I clock is used for phase acquisition/detection). The Q clock on the other hand is 90 degree out of phase when compared to the I clock and is used in conjunction with the I clock to determine frequency information for the CDR clock signal (e.g., the I and Q clocks are used for frequency acquisition/detection).

In some examples, the CTLE circuit 306 operates to: receive an analog data signal at its first input 307; receive a CTLE index at its second input 308; and provide CTLE results at its output 309 responsive to the analog data signal and the CTLE index. The DFE circuit 310 operates to: receive data samples at its first input 312; receive DFE coefficient(s) at its second input 314; receive a sampling clock signal at its third input 316; and provide DFE results at its output 317 responsive to the data samples, the DFE results, and the sampling clock signal. The combine circuit 302 operates to: receive CTLE results at its first input 303; receive DFE results at its second input 304; and provide equalization results at its output 305 responsive to the CTLE results and the DFE results.

The error sampler 374 operates to: receive the equalization results at its first input 375; receive the sampling clock signal at its second input 376; and provide error samples at its output 377 responsive to the equalization signal and the first CDR clock signal. The data sampler 378 operates to: receive the equalization signal at its first input 379; receive the sampling clock signal at its second input 380; and provide data sample results at its output 381 responsive to the equalization signal and the sampling clock signal. The first deserializer 318 operates to: receive the error samples from the error sampler 374; and provide deserialized error samples at its output 320 responsive to the received error samples. The second deserializer 322 operates to: receive data samples from the data sampler 378; and provide deserialized data sample at its output 324 responsive to the received data samples.

The digital equalizer adaptation circuit 326 operates to: receive deserialized error samples from the first deserializer 318; receive deserialized data samples from the second deserializer 322; provide CTLE index results at the first output 331 responsive to the deserialized error samples and the deserialized data samples; and provide one or more DFE coefficients at the second output 332 responsive to the deserialized error samples and the deserialized data samples.

In some examples, the clock adjustment controller 334 operates to: receive the CTLE index results from the digital equalizer adaptation circuit 326 at its input 335; and provide a clock adjustment control signal at its output 336 responsive to the CTLE index results. In some examples, the clock adjustment controller 334 includes a processor and a memory. In such examples, the memory may include a look-up table (LUT) to provide a delay code as the clock adjustment control signal responsive to the CTLE index results. In some examples, the clock adjustment controller 334 maps the delay code to the CTLE index which could be directly outputted in analog domain using an analog adaptation scheme. As another option, the clock adjustment controller 334 uses a phase-interpolator (PI). This options lends itself to PI-based CDR circuitry as in FIG. 6 instead of VCO-based CDR circuitry as in FIGS. 3-5.

In some examples, the digital equalizer adaptation circuit 326 and the deserializers 318 and 322 may be replaced by analog equalizer adaptation circuitry using filters and rectifiers. In such examples, the CTLE input and DFE coefficients could be controlled through a control voltage or current instead of digital coefficients. As an option, analog equalizer adaptation circuitry can be followed by an analog-to-digital conversion (ADC) if digital control signals are desired.

Figure 4:
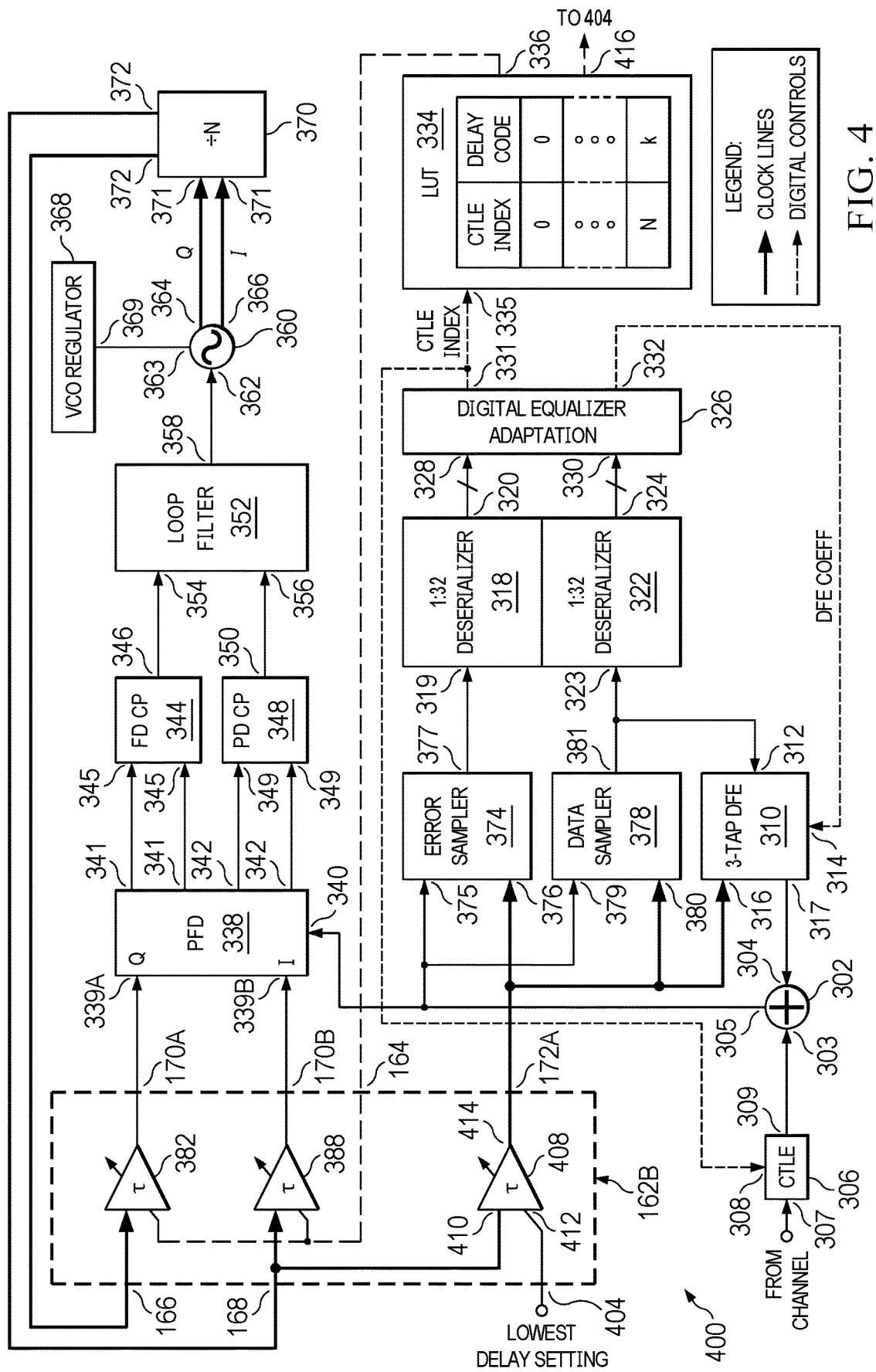

The first delay circuit 382 operates to: receive the first CDR clock signal at its first input 384; receive the clock adjustment control signal at its second input 385; and provide a delayed version of the first CDR clock signal at its output 386 responsive to the first CDR clock signal and the clock adjustment control signal. The second delay circuit 388 operates to: receive the second CDR clock signal at its first input 390; receive the clock adjustment control signal at its second input 391; and provide a delayed version of the second CDR clock signal at its output 392 responsive to the second CDR clock signal and the clock adjustment control signal. In different examples, delay circuits such as the first delay circuit 382 and the second delay circuit 388 may be a digital controlled delay circuit or an analog controlled delay circuit. FIGS. 3 and 4 implement the first delay circuit 382 and the second delay circuit 388 as digital controlled delay circuits. For analog controlled delay circuits, a control voltage or current may be used to adjust the delay.

In some examples, the clock adjustment controller 334 may include a LUT, a digital-to-analog converter (DAC), a current source, and/or other circuitry to provide a clock adjustment control signal for digital controlled delay circuits or analog controlled delay circuits of clock adjustment circuitry such as the clock adjustment circuitry 162A.

In some examples, the clock adjustment controller 334 adjusts clock(s) such that the sampling clock signal is shifted to the left relative to the CDR clock. This results in an insignificant change in the main cursor term (i.e., $c_0' \approx c_0$) due the flat region in the pulse response around the peak. The offset between the sampling clock signal and the CDR clock results in a significant change in the pre-cursor ISI term (i.e., $c_{-1}' \ll c_{-1}$) and lowers the pre-cursor ISI between the current bit and previous bit. In some examples, the clock adjustment controller 334 used CTLE index results to control the offset between the sampling clock signal and the CDR clock signal as the CTLE index provides an indication of the channel loss and hence the shape of the pulse response. As the length of the channel increases, the pre-cursor ISI ratio $c_{-1}/c_0$ increases. Accordingly, in some examples, the amount of offset between the sampling clock signal and the CDR clock signal is increased as the channel length increases. Without limitation, the relationship between the CTLE index and offset between the sampling clock signal and the CDR clock signal may be defined using an LUT.

In the example of FIG. 4, the receiver 400 includes the CTLE circuit 306, the combine circuit 302, the DFE circuit 310, the error sampler 374, the data sampler 378, the first deserializer 318, the second deserializer 322, the digital equalizer adaptation circuit 326, the clock adjustment controller 334, the PFD 338, the frequency detector charge pump 344, the phase detector charge pump 348, the loop filter 352, the VCO 360, the VCO regulator 368, and the divider 370 described in FIG. 3. While not specifically shown in FIG. 4, respective components of the receiver 400 may be part of equalizer circuitry, CDR circuitry, sampler circuitry, adaptation circuitry, and clock adjustment circuitry as described in FIG. 3. The difference between the receiver 400 of FIG. 4 and the receiver 300 of FIG. 3 is that the clock adjustment circuitry 162B in FIG. 4 includes delay circuits for the CDR clock signals and for the sampling clock signal. In other words, both the CDR clock signals and the sample clock signal may be delayed. To support flexible delay options, the clock adjustment controller 334 in FIG. 4 may have a second output 416 to provide a second clock adjustment control signal for the clock adjustment circuitry 162B.

As shown in FIG. 4, the clock adjustment circuitry 162B has the first input 164, the second input 166, the third input 168, the first output 170A, and the second output 170B described in FIG. 3. In addition, the clock adjustment circuitry 162B has a fourth input 404 and a third output 172A. The third output 172A is an example of the second output 172 in FIG. 1. In some examples, the clock adjustment circuitry 162B includes the first delay circuit 382 and the second delay circuit 388 described in FIG. 3 as well as a third delay circuit 408. The third delay circuit 408 has a first input 410, a second input 412, and an output 414. The first input 410 of the third delay circuit 408 is coupled to the second input 166 of the clock adjustment circuitry 162B. The second input 412 of the third delay circuit 408 is coupled to the fourth input 404 of the clock adjustment circuitry 162B. The output 414 of the clock adjustment circuitry 162B is coupled to the third output 172A of the clock adjustment circuitry 162B. In some examples, the fourth input 404 is coupled to the second output 416 of the clock adjustment controller 334.

In some examples, the first delay circuit 382 and the second delay circuit 388 provide delayed first and second CDR clock signals to the PFD 338 as in FIG. 3. However, the third delay circuit 408 operates to: receive the first CDR clock signal at its first input 410; receive the second clock adjustment control signal at its second input 412; and provide a sampling clock signal at its output 414 responsive to the first CDR clock signal and the second clock adjustment control signal. To mitigate pre-cursor ISI as described herein, the delay of the first delay circuit 382 and the second delay circuit 388 is greater than the delay of the third delay circuit 408. In some examples, the delay of the third delay circuit 408 is fixed. In some examples, the delay of the third delay circuit 408 is set to a minimum delay option. With the clock adjustment circuitry 162B and related control options, the offset between the CDR clock signal and the sampling clock signal can be smaller or more fine-tuned compared to an offset based only on CTLE index results as in FIG. 3. As needed, the offset between the CDR clock signal and the sampling clock signal can be reduced to zero.

Figure 5:
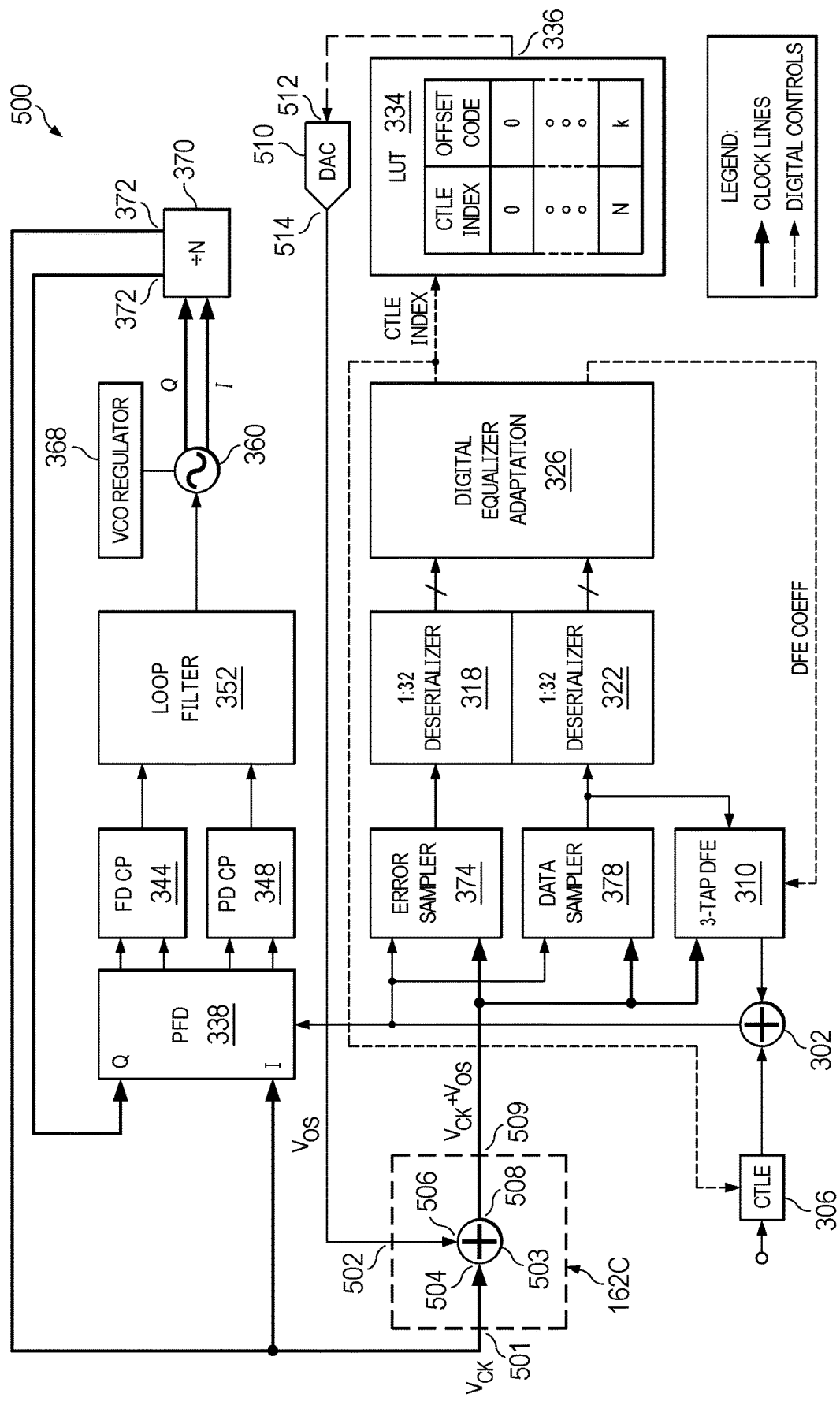

In the example of FIG. 5, the receiver 500 includes the CTLE circuit 306, the combine circuit 302, the DFE circuit 310, the error sampler 374, the data sampler 378, the first deserializer 318, the second deserializer 322, the digital equalizer adaptation circuit 326, the clock adjustment controller 334, the PFD 338, the frequency detector charge pump 344, the phase detector charge pump 348, the loop filter 352, the VCO 360, the VCO regulator 368, and the divider 370 described in FIG. 3. While not specifically shown in FIG. 5, respective components of the receiver 500 may be part of equalizer circuitry, CDR circuitry, sampler circuitry, adaptation circuitry, and clock adjustment circuitry as described in FIG. 3. The difference between the receiver 500 of FIG. 5 and the receiver 300 of FIG. 3 is that the clock adjustment circuitry 162C in FIG. 5 adjusts a phase of the sampling clock signal so that CDR clock signal is delayed relative to the sampling clock signal. Also, the receiver 500 includes a DAC 510 between the output 336 of the clock adjustment controller 334 and the clock adjustment circuitry 162C.

As shown in FIG. 5, the DAC 510 has an input 512 and an output 514. The clock adjustment circuitry 162C has a first input 501, a second input 502, and an output 509. The clock adjustment circuitry 162C includes a combine circuit 503 having a first input 504, a second input 506, and an output 508.

In some examples, the input 512 of the DAC 510 is coupled to the output 336 of the clock adjustment controller 334. The output 514 of the DAC 510 is coupled to the second input 502 of the clock adjustment circuitry 162C. The first input 501 of the clock adjustment circuitry 162C is coupled to one of the outputs 372 of the divider 370. The first input 504 of the combine circuit 503 is coupled to the first input 501 of the clock adjustment circuitry 162C. The second input 506 of the combine circuit 503 is coupled to the second input 502 of the clock adjustment circuitry 162C. The output 508 of the combine circuit 503 is coupled to the output 509 of the clock adjustment circuitry 162C. As shown, the output 509 of the clock adjustment circuitry 162C is coupled to respective inputs of the error sampler 374, the data sampler 378, and the DFE circuit 310.

In some examples, the DAC 510 operates to: receive a control signal from the clock adjustment controller 334 at its input 512; and provide an offset voltage ($V_{OS}$) at its output 514 responsive to the control signal. In some examples, the combine circuit 503 operates to: receive a second CDR clock signal ($V_{CK}$) at its first input 504; receive $V_{OS}$ at its second input 506; and provide $V_{CK}+V_{OS}$ at its output 508 responsive to $V_{CK}$ and $V_{OS}$. Relative to the phase of $V_{CK}$, the phase of $V_{CK}+V_{OS}$ is shifted to the left such that the on-time of $V_{CK}$ is delayed relative to the on-time of $V_{CK}+V_{OS}$. In some examples, $V_{CK}$ is the same as I clock in FIGS. 3 and 4. With the clock adjustment circuitry 162C, pre-cursor ISI is mitigated as described herein.

In some examples, the clock adjustment controller 334 adjusts clock(s) such that the sampling clock signal is shifted to the left relative to the CDR clock signal. This results in an insignificant change in the main cursor term (i.e., $c_0' \approx c_0$) due the flat region in the pulse response around the peak. The offset between the sampling clock signal and the CDR clock signal results in a significant change in the pre-cursor ISI term (i.e., $c_{-1}' \ll c_{-1}$) and lowers the pre-cursor ISI between the current bit and previous bit. In some examples, the clock adjustment controller 334 used CTLE index results to control the offset between the sampling clock signal and the CDR clock signal as the CTLE index provides an indication of the channel loss and hence the shape of the pulse response. As the length of the channel increases, the pre-cursor ISI ratio $c_{-1}/c_0$ increases. Accordingly, in some examples, the amount of offset between the sampling clock signal and the CDR clock signal is increased as the channel length increases. Without limitation, the relationship between the CTLE index and offset between the sampling clock signal and the CDR clock signal is defined using an LUT.

Figure 6:
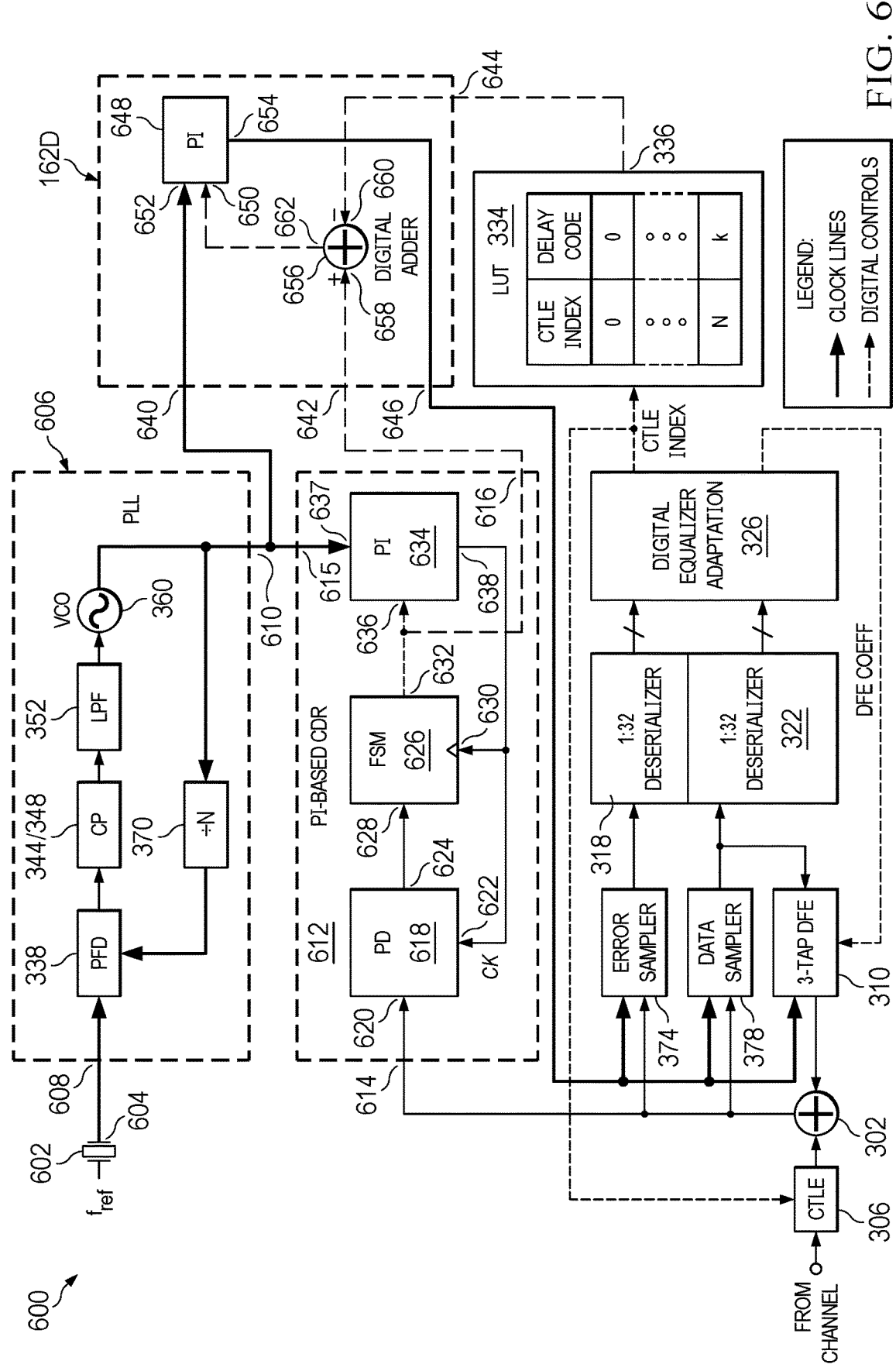

In the example of FIG. 6, the receiver 600 includes the CTLE circuit 306, the combine circuit 302, the DFE circuit 310, the error sampler 374, the data sampler 378, the first deserializer 318, the second deserializer 322, the digital equalizer adaptation circuit 326, the clock adjustment controller 334, the PFD 338, the charge pumps 344 and 348, the loop filter 352, the VCO 360, and the divider 370 described in FIG. 3. While not specifically shown in FIG. 6, respective components of the receiver 600 may be part of equalizer circuitry, CDR circuitry, sampler circuitry, adaptation circuitry, and clock adjustment circuitry as described in FIG. 3. The difference between the receiver 600 of FIG. 6 and the receiver 300 of FIG. 3 is that the receiver 600 also uses a reference clock source 602, PI-based CDR circuitry 612, and PI-based clock adjustment circuitry 162D.

In some examples, the reference clock source 602 provides a reference clock signal to the PFD circuit 338. For example, the reference clock source 602 is a crystal oscillator or a microelectromechanical system (MEMS)-based oscillator that operates to provide the reference clock signal. The reference clock signal may have a frequency of 25 MHz, 100 MHz, or another frequency. For receivers with a reference clock source such as the receiver 600, the CDR circuitry may include PI-based CDR circuitry 612 and a phase-locked loop (PLL) 606.

In the example of FIG. 6, the PFD circuit 338, the charge pumps 344 and 348, the loop filter 352, the VCO 360, and the divider 370 are components of the PLL 606. The PI-based CDR circuitry 612 includes a phase detector circuit 618, a finite state machine (FSM) 626, and a first PI circuit 634. To adjust the sampling clock signal provided to the error sampler 374, the data sampler 378, and the DFE circuit 310 relative to the CDR clock signal provided from the PLL 606, the receiver 600 uses the PI-based clock adjustment circuitry 162D.

In the example of FIG. 6, the reference clock source 602 has an output 604. The PLL 606 has an input 608 and an output 610. The PI-based CDR circuitry 612 has a first input 614, a second input 615, and an output 616. The phase detector circuit 618 has a first input 620, a second input 622, and an output 624. The FSM 626 has a first input 628, a second input 630, and an output 632. The first PI circuit 634 has a first input 636, a second input 637, and an output 638.

In the example of FIG. 6, the PI-based clock adjustment circuitry 162D has a first input 640, a second input 642, a third input 644, and an output. The PI-based clock adjustment circuitry 162D includes a second PI circuit 648 and a combine circuit 656. In some examples, the combine circuit 656 is a digital adder. The second PI circuit 648 has a first input 650, a second input 652, and an output 654. The combine circuit 656 has a first input 658, a second input 660, and an output 662. The clock adjustment circuitry 162D is an example of the clock adjustment circuitry 162.

As illustrated, the output 604 of the reference clock source 602 is coupled to the input 608 of the PLL 606. A first input (e.g., the first input 339A) of the PFD circuit 338 is coupled to the input 608 of the PLL 606. The output 610 of the PLL 606 is coupled to the second input 615 of the PI-based CDR circuitry 612. As shown, the output 610 of the PLL 606 is coupled to the output of the VCO 360. In some examples, the output of the VCO 360 represented in FIG. 6 is a Q clock signal output. The first input 614 of the PI-based CDR circuitry 612 is coupled to the output 305 of the combine circuit 302. The output 616 of the PI-based CDR circuitry 612 is coupled to the second input 642 of the PI-based clock adjustment circuitry 162D. The first input 640 of the PI-based clock adjustment circuitry 162D is coupled to the output 610 of the PLL 606. The third input 644 of the PI-based clock adjustment circuitry 162D is coupled to the output 336 of the clock adjustment controller 334. The output 646 of the PI-based clock adjustment circuitry 162D is coupled to and provides an adjusted clock signal to the error sampler 374, the data sampler 378, and the DFE circuit 310.

In some examples, the first input 650 of the second PI circuit 648 is coupled to the output 662 of the combine circuit 656. The second input 652 of the second PI circuit 648 is coupled to the first input 640 of the PI-based clock adjustment circuitry 162D. The output of the second PI circuit 654 is coupled to the output 646 of the PI-based clock adjustment circuitry 162D. The first input 658 of the combine circuit is coupled to the second input 642 of the PI-based clock adjustment circuitry 162D. The second input 660 of the combine circuit 656 is coupled to the third input 644 of the PI-based clock adjustment circuitry 162D.

As illustrated, the first input 620 of the phase detector circuit 618 is coupled first input 614 of the PI-based CDR circuitry 612. The second input 622 of the phase detector circuit 618 is coupled to the output 638 of the first PI circuit 634. The output of the phase detector circuit 618 is coupled to is coupled to the first input 628 of the FSM 626. The second input 630 of the FSM 626 is coupled to the output 638 of the first PI circuit 634. The output 632 of the FSM 626 is coupled to the first input 636 of the first PI circuit 634 and to the output 616 of the PI-based CDR circuitry 612. The second input 637 of the first PI circuit 634 is coupled to the second input 615 of the PI-based CDR circuitry 612.

In operation, the CDR clock signal at the output of the PLL 606 is provided to the second PI circuit 648 to adjust the phase of the sampling clock signal to align with the equalization results (e.g., the equalized data) provided by the combine circuit 302. The PI-based CDR circuitry 612 operates to: compare the phases of the equalization results and a PI-based clock signal using the phase detector circuit 618; process the output of the phase detector circuit 618 and provide a resulting control code using the FSM 626; and provide the PI-based clock signal using the first PI circuit 634 responsive to the control code from the FSM 626 and the CDR clock signal from the PLL 606. In this example, the CDR clock signal is a PLL-based clock signal.

The phase detector circuit 618 operates to: receive the equalization results at its first input 620; receive the PI-based clock signal from the first PI circuit 634 at its second input 622; and provide comparison results at its output 624 responsive to the equalization results and the PI-based clock signal. The FSM 626 operates to: receive the comparison results from the phase detector circuit 618 at its first input 628; receive the PI-based clock signal from the first PI circuit 634 at its second input 630; and provide the control code at its output 632 responsive to the comparison results and the PI-based clock signal. The first PI circuit 634 operates to: receive the control code from the FSM 626 at its first input 636; receive a PLL-based clock signal from the PLL 606 at its second input 637; and provide the PI-based clock signal at its output 638 responsive to the control code and the PLL-based clock signal.

In the example of FIG. 6, the phase shift between CDR clock signal and sampling clock signal is controlled by offsetting the control codes used for the first PI circuit 634 and the second PI circuit 648. For example, if the LUT delay code is k, and the first PI circuit code is M, then the combine circuit 656 provides the second PI circuit code (M−k). The offset control codes for the first PI circuit 634 and the second PI circuit 648 result in the sampler clock signal phase being shifted to the left relative to the CDR clock signal phase corresponding to the delay offset code of −k.

In some examples, the clock adjustment controller 334 adjusts clock(s) such that the sampling clock signal is shifted to the left relative to the CDR clock signal. This results in an insignificant change in the main cursor term (i.e., $c_0' \approx c_0$) due the flat region in the pulse response around the peak. The offset between the sampling clock signal and the CDR clock signal results in a significant change in the pre-cursor ISI term (i.e., $c_{-1}' \ll c_{-1}$) and lowers the pre-cursor ISI between the current bit and previous bit. In some examples, the clock adjustment controller 334 used CTLE index results to control the offset between the sampling clock signal and the CDR clock signal as the CTLE index provides an indication of the channel loss and hence the shape of the pulse response. As the length of the channel increases, the pre-cursor ISI ratio $c_{-1}/c_0$ increases. Accordingly, in some examples, the amount of offset between the sampling clock signal and the CDR clock signal is increased as the channel length increases. Without limitation, the relationship between the CTLE index and offset between the sampling clock signal and the CDR clock signal may be defined using an LUT.

Figure 7:
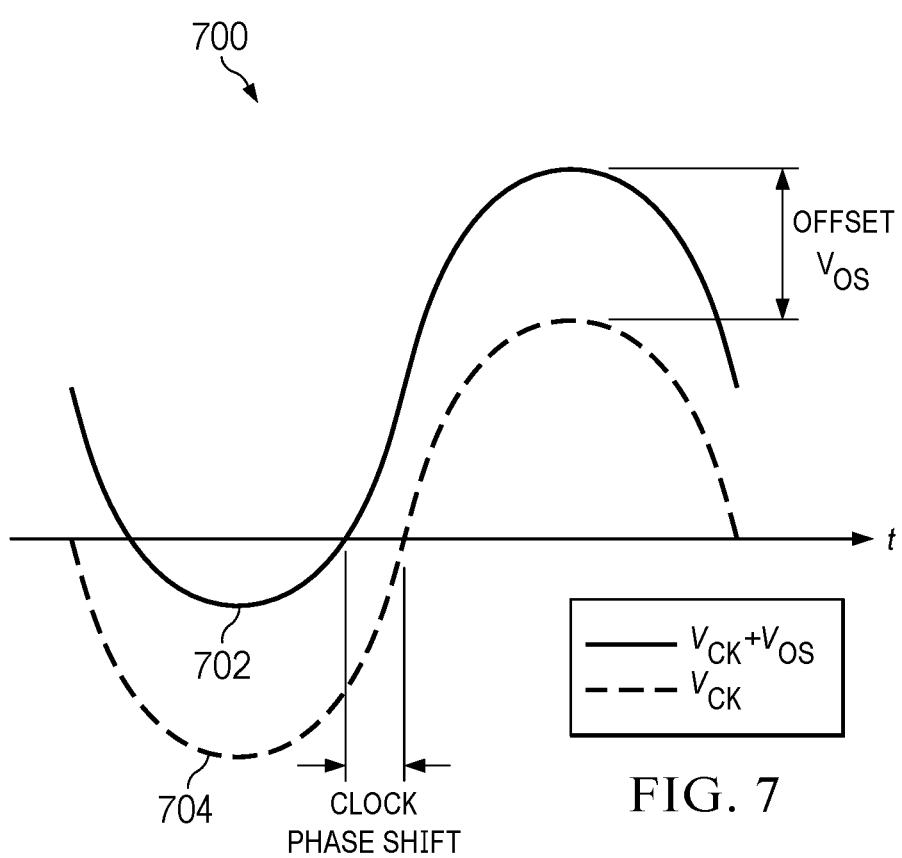
FIG. 7 is a graph showing an example sampling clock signal.

FIG. 7 is a graph 700 showing an example sampling clock signal adjustment. In graph 700, a $V_{CK}$ signal 704 and a $V_{CK}+V_{OS}$ signal 702 are represented. As shown, $V_{CK}+V_{OS}$ signal 702 has a similar shape compared to the $V_{CK}$ signal 704 but has a higher voltage level due to $V_{OS}$. Accordingly, the phase of $V_{CK}+V_{OS}$ signal 702 is shifted to the left compared to $V_{CK}$ signal 704. In other words, the $V_{CK}+V_{OS}$ signal 702 crosses zero before the $V_{CK}$ signal crosses zero. The receiver 500 of FIG. 5 uses the sampling clock signal adjustment strategy represented in graph 700 to delay the CDR clock signal relative to the sampling clock signal and mitigate pre-cursor ISI. As desired, adding a voltage offset to a CDR clock signal (as in FIG. 5) may be combined with delay circuitry (as in FIGS. 3 and 4), and/or phase interpolator adjustment (as in FIG. 6).

Figure 8A:
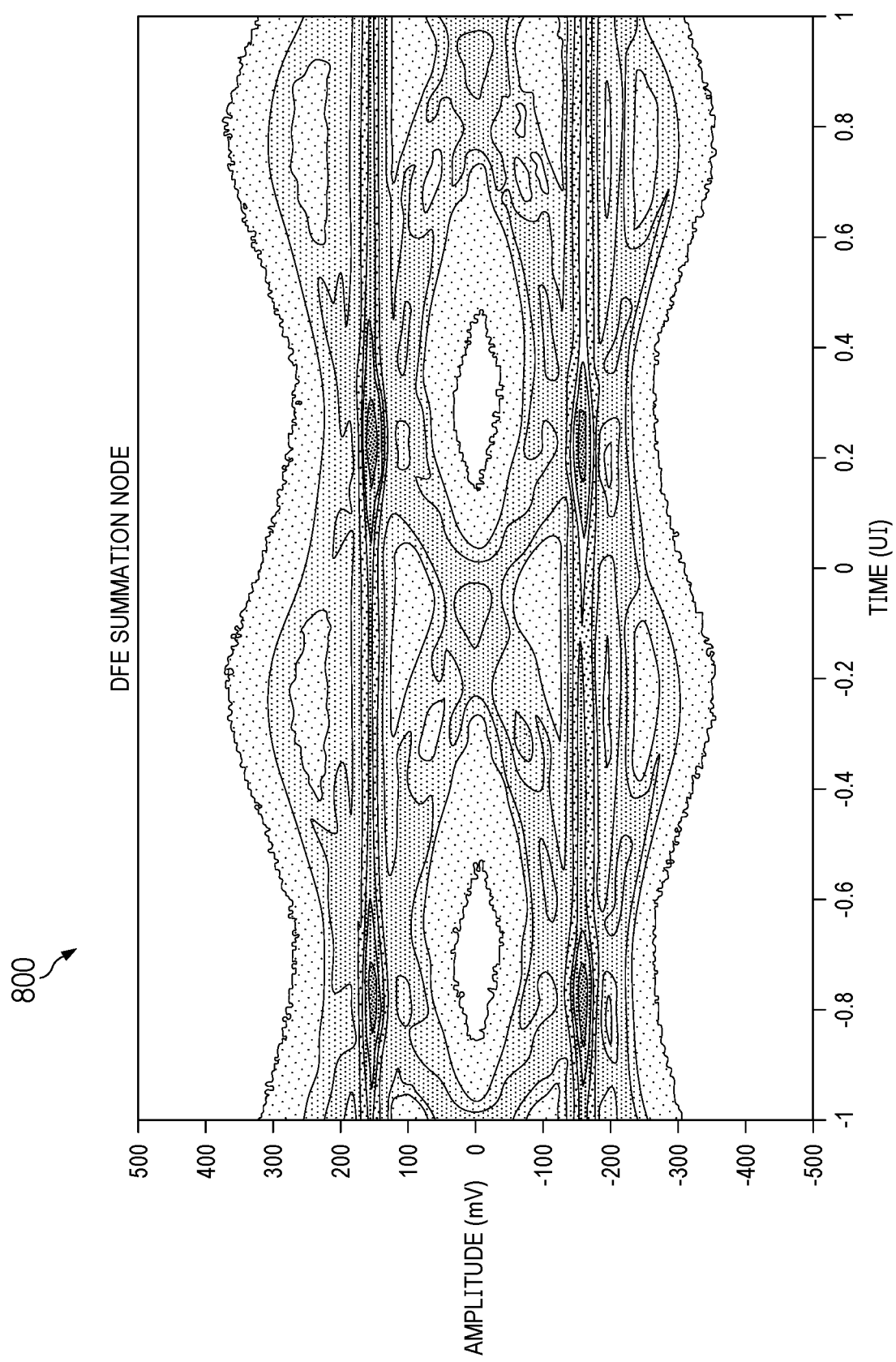
FIG. 8a shows an example eye diagram without clock adjustment.

FIG. 8a shows an example eye diagram 800 without clock adjustment of a signal output from a DFE summation node (e.g., the output from a combine circuit, which is coupled to a DFE circuit). Without clock adjustment, the eye size may be smaller than desired indicating higher likelihood of ISI issues such as pre-cursor ISI. By contrast, FIGS. 8b and 8c show example eye diagrams 810 and 820 in which the CDR clock signal is delayed relative to the sampling clock signal consistent with described examples.

Figure 8B:
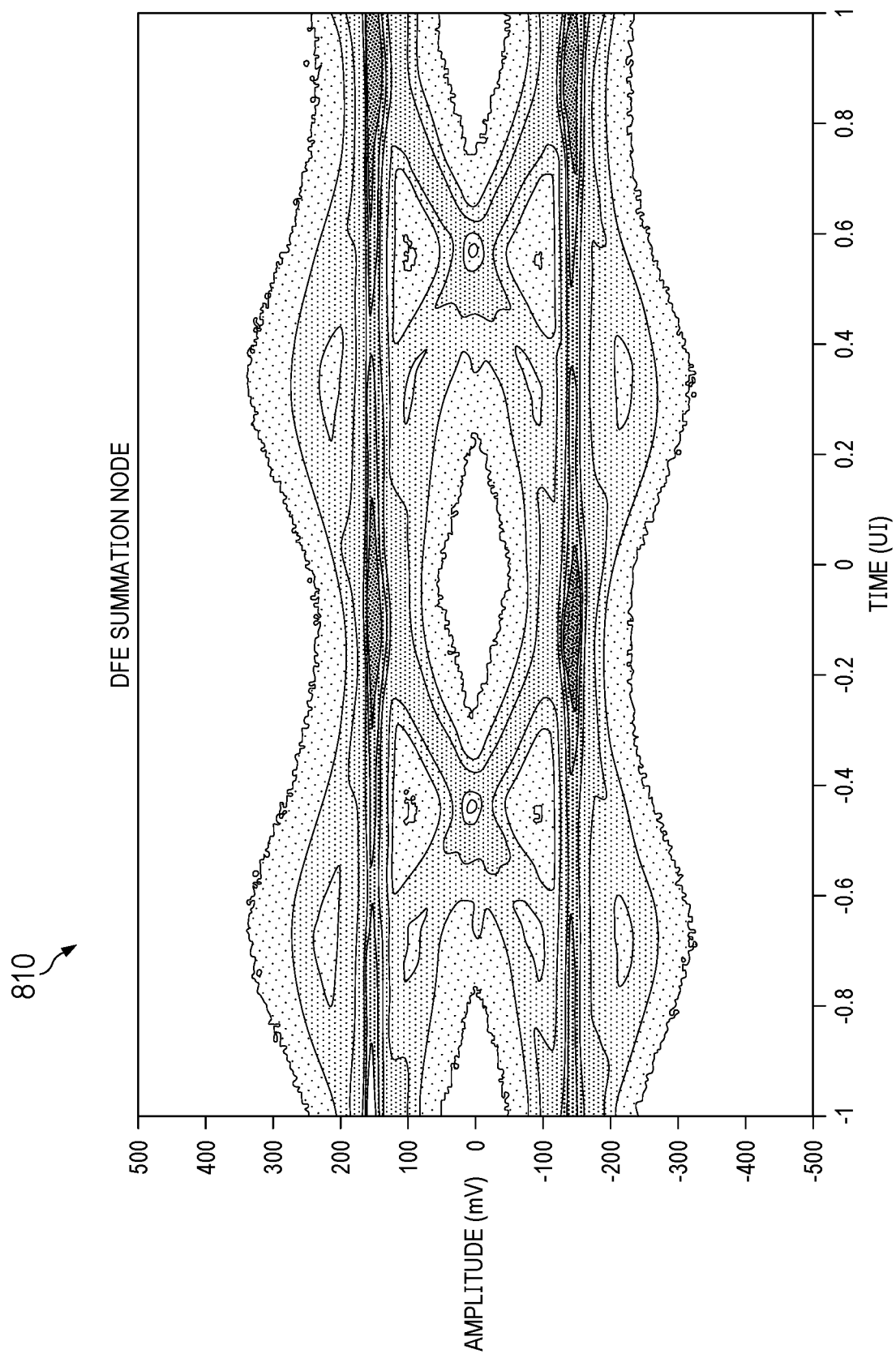
FIGS. 8b and 8c show example eye diagrams in which the CDR clock signal is delayed relative to the sampling clock signal.

In the example of FIG. 8b, the signal is output from a DFE summation node (e.g. output from the combine circuit 302, which is coupled to the DFE circuit 310), and the sampling clock signal is offset from the CDR clock signal by 5 ps. As shown, the eye size in the eye diagram 810 of FIG. 8b is larger than the eye size in the eye diagram 800 of FIG. 8a. The increase in eye size indicates the mitigation of ISI issues such as pre-cursor ISI.

Figure 8C:
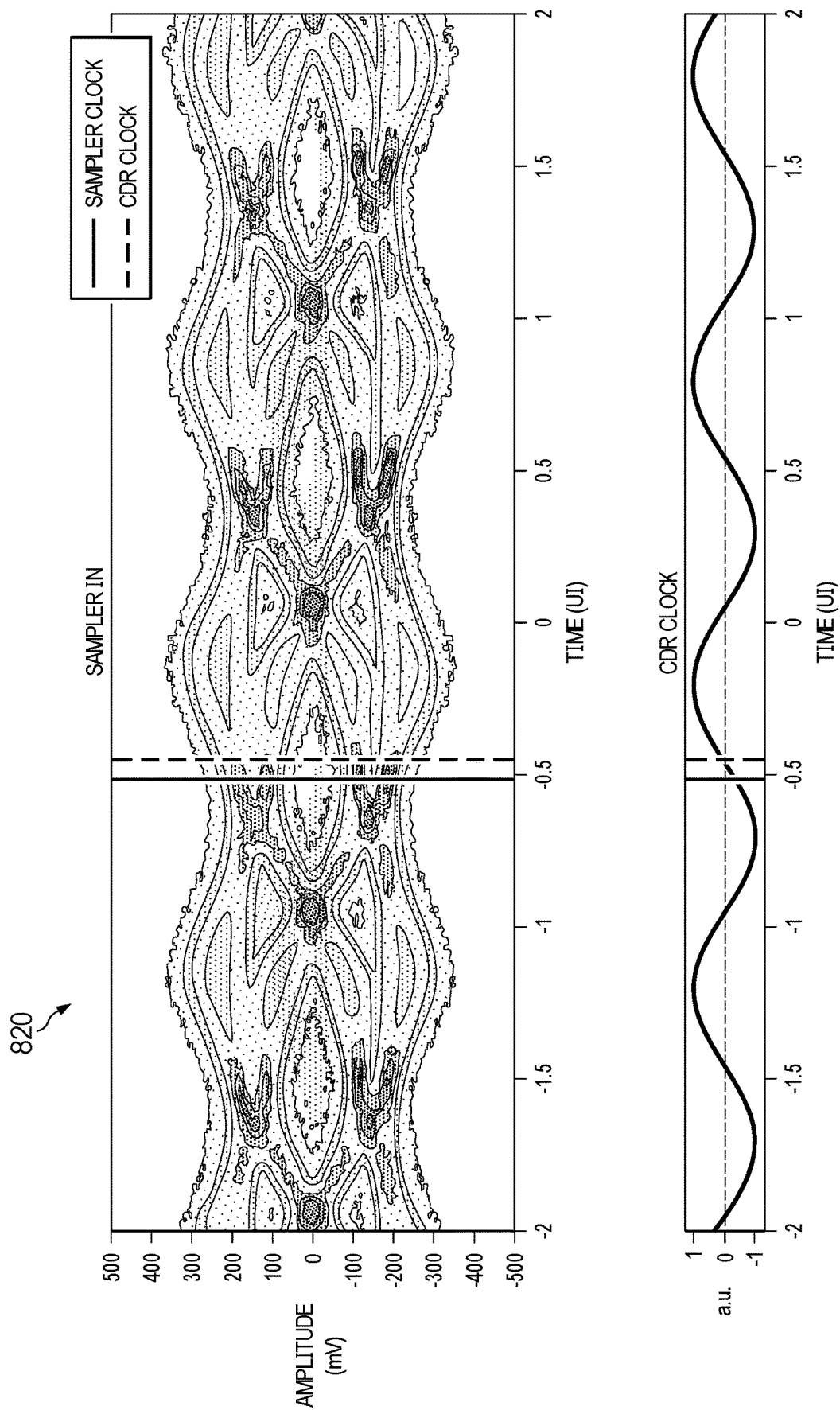

In the example of FIG. 8c, the eye diagram is of a signal at the input of the sampler circuit, and the sampling clock signal is offset from the CDR clock signal by about 0.1 unit interval (UI). In different examples, the amount of offset between the sampling clock signal and the CDR clock signal may vary. With the offset, the sampling clock signal is better aligned with the center of the eye in the eye diagram 820 of FIG. 8c. Adjusting the sampling clock signal relative to the CDR clock signal mitigates ISI issues such as pre-cursor ISI.

Figure 9:
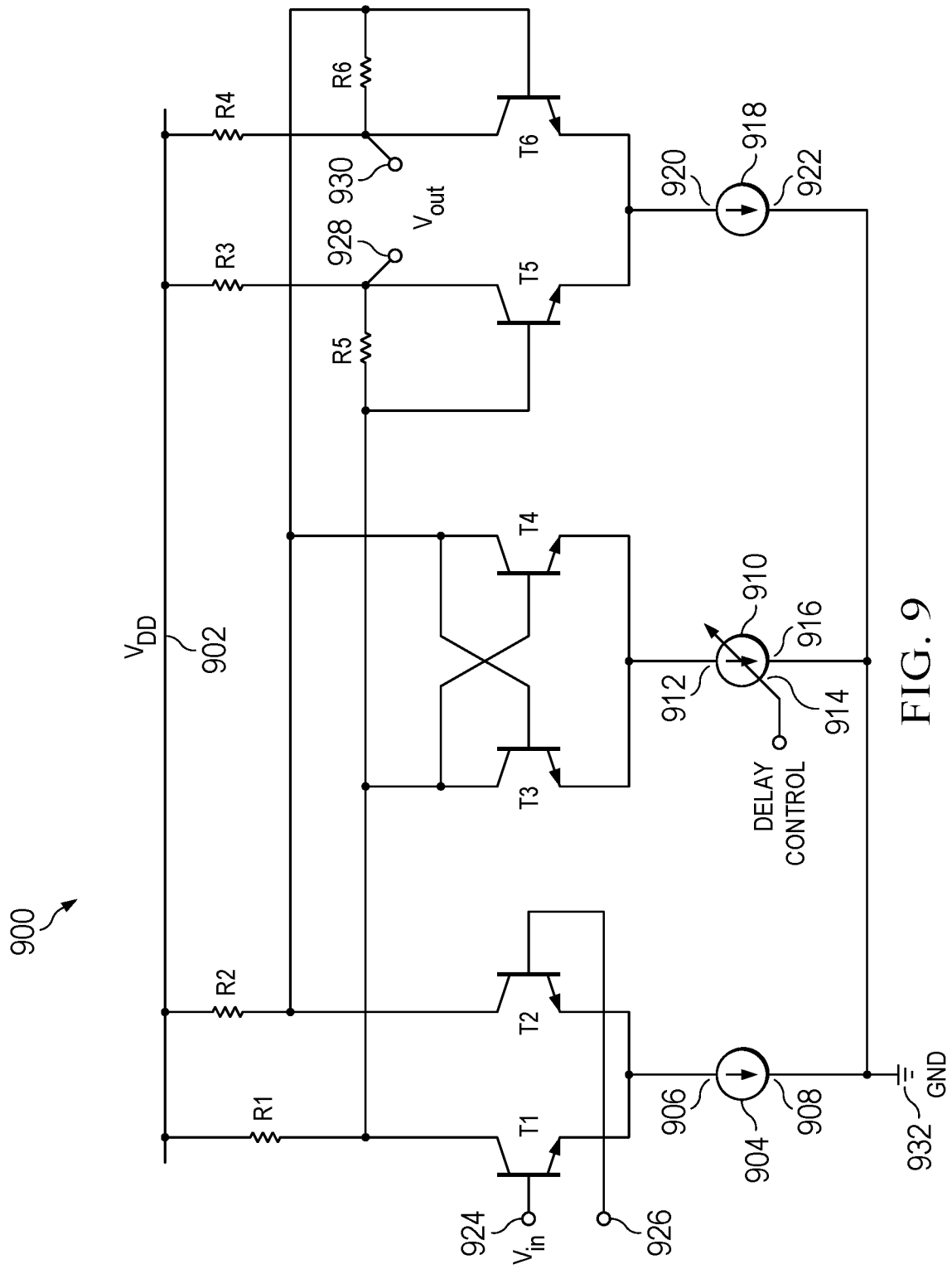
FIG. 9 is a schematic diagram showing an example delay circuit.

FIG. 9 is a schematic diagram showing an example delay circuit 900. The delay circuit 900 is an example of the first delay circuit 382 in FIGS. 3 and 4, the second delay circuit 388 in FIGS. 3 and 4, or the third delay circuit 408 in FIG. 4. As shown, the delay circuit 900 has a power supply ($V_{DD}$) terminal 902, a first input voltage ($V_{in}$) terminal 924, a second $V_{in}$ terminal 926, a first output voltage ($V_{out}$) terminal 928, a second V$_{out}$ terminal 930, and a ground terminal 932. The delay circuit 900 includes resistors R1 to R6, transistors T1 to T6, a first current source 904, a second current source 910, and a third current source 918 in the arrangement shown. In the example of FIG. 9, each of the resistors R1 to R6 has a first terminal and second terminal. Each of transistors T1 to T6 has a first terminal, a second terminal, and a control terminal. The first current source 904 has a first terminal 906 and a second terminal 908. The second current source 910 has a first terminal 912, a second terminal 916, and a control terminal 914. The third current source 918 has a first terminal 920 and a second terminal 922.

In some examples, the first terminal of resistor R1 is coupled to the V$_{DD}$ terminal 902. The second terminal of the resistor R1 is coupled to the first terminals of the transistors T1 and T3, the control terminals of the transistors T4 and T5, and the first terminal of resistor R5. The control terminal of the transistor T1 is coupled to the first V$_{in}$ terminal 924. The second terminal of transistor T1 is coupled to the first terminal 906 of the first current source 904. The second terminal 908 of the first current source 904 is coupled to the ground terminal 932. The first terminal of the resistor R2 is coupled to the V$_{DD}$ terminal 902. The second terminal of the resistor R2 is coupled to the first terminals of the transistors T2 and T4, the control terminals of the transistors T3 and T6, and the first terminal of the resistor R6. The control terminal of the transistor T2 is coupled to the second V$_{in}$ terminal 926. The second terminal of transistor T2 is coupled to the first terminal 906 of the first current source 904. The second terminals of the transistors T3 and T4 are coupled to the first terminal 912 of the second current source 910. The second terminal 916 of the second current source 910 is coupled to the ground terminal 932. The control terminal 914 of the second current source 910 receive a delay control signal such as the clock adjustment control signal described herein.

The first terminal of the resistor R3 is coupled to the V$_{DD}$ terminal 902. The second terminal of the resistor R3 is coupled to the second terminal of the resistor R5, the first terminal of the transistor T5, and the first V$_{out}$ terminal 928. The second terminal of the transistor T5 is coupled to the first terminal 920 of the third current source 918. The second terminal 922 of the third current source 918 is coupled to the ground terminal 932. The first terminal of the resistor R4 is coupled to the V$_{DD}$ terminal 902. The second terminal of the resistor R4 is coupled to the second terminal of the resistor R6, the first terminal of the transistor T6, and the second V$_{out}$ terminal 930. The second terminal of the transistor T6 is coupled to the first terminal 920 of the third current source 918.

The delay circuit 900 operates to: receive V$_{in}$ as the voltage across the first and second V$_{in}$ terminals 924 and 926; receive the delay control signal at the control terminal 914 of the second current source 910; and provide V$_{out}$ as the voltage across the first and second V$_{out}$ terminals 928 and 930 responsive to V$_{in}$ and the delay control signal. With the delay circuit 900, V$_{out}$ follows V$_{in}$ with some delay. In some examples, V$_{out}$ may have a different current level relative to V$_{in}$. In some examples, the transistors T1-T6 of the delay circuit 900 may be implemented as NPN bipolar transistors as shown or as n-channel metal-oxide semiconductor (NMOS) transistors. In other examples, a delay circuit may use PNP bipolar transistors or p-channel metal-oxide semiconductor (PMOS) transistors and a flipped topology relative to the delay circuit 900.

Figure 10:
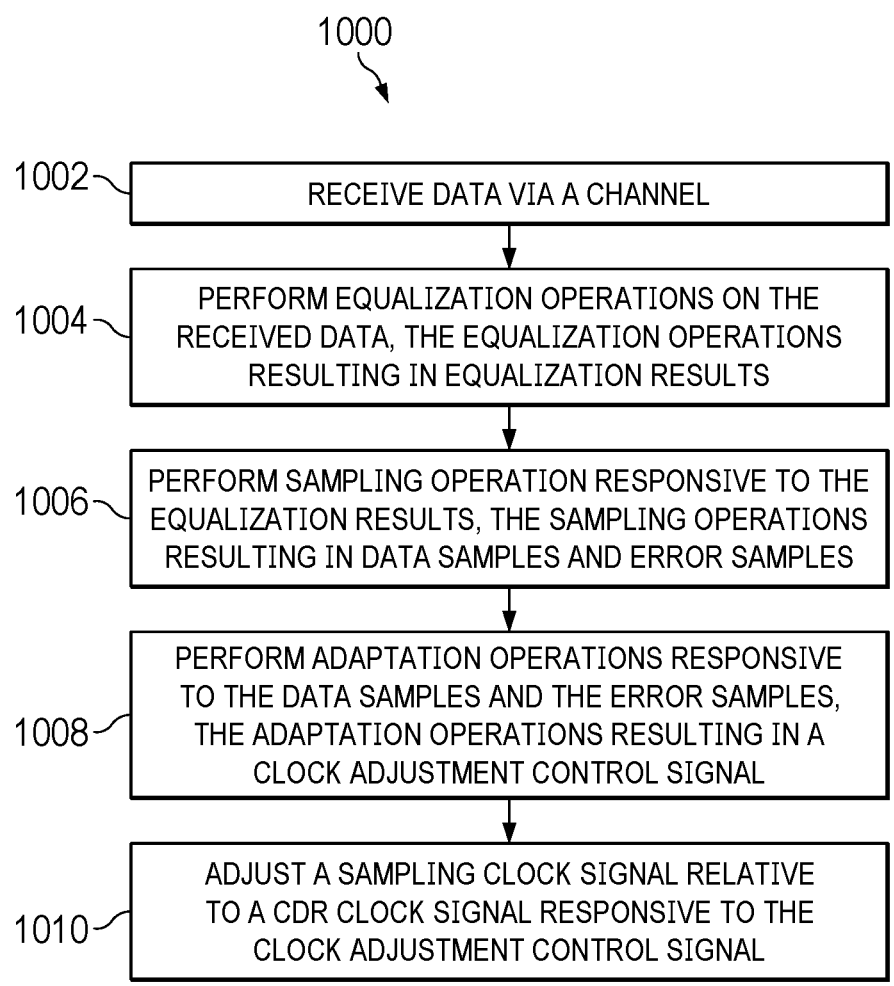
FIG. 10 is a flowchart showing an example method.

FIG. 10 is a flowchart showing an example method 1000. The method 1000 is performed, for example, by a receiver such as receiver 112 of FIG. 1. As shown, the method 1000 includes receiving data via a channel at block 1002. At block 1004, equalization operations are performed on the received data, the equalization operations resulting in equalization results. At block 1006, sampling operations are performed responsive to the equalization results, the sampling operations resulting in data samples and error samples. At block 1008, adaptation operations are performed responsive to the data samples and the error samples, the adaptation operations resulting in a clock adjustment control signal. At block 1010, a sampling clock signal is adjusted relative to a CDR clock signal responsive to the clock adjustment control signal.

In some examples, adjusting the sampling clock signal relative to the CDR clock signal responsive to the clock adjustment control signal in block 1010 includes delaying the CDR clock signal relative to the sampling clock signal responsive to the clock adjustment control signal. In some examples, adjusting the sampling clock signal relative to the CDR clock signal responsive to the clock adjustment control signal in block 1010 includes adjusting a voltage of the sampling clock signal relative to a voltage of the CDR clock signal responsive to the clock adjustment control signal. In some examples, adjusting the sampling clock signal relative to the CDR clock signal responsive to the clock adjustment control signal in block 1010 includes adjusting a phase of the sampling clock signal relative to a phase the CDR clock signal responsive to the clock adjustment control signal.

In some examples, a receiver (e.g., the receiver 112 or variants herein) includes equalizer circuitry (e.g., the equalizer circuitry 114 or variants herein) having a first input (e.g., the first input 116 or variants herein), a second input (e.g., the second input 118 or variants herein), a third input (e.g., the third input 120 or variants herein), a fourth input (e.g., the fourth input 122 or variants herein), a fifth input (e.g., the fifth input 124 or variants herein), and an output (e.g., the output 126 or variants herein). The receiver also includes CDR circuitry (e.g., the CDR circuitry 140 or variants herein) having a first input (e.g., the first input 142 or variants herein), a second input (e.g., the second input 144 or variants herein), and a clock output (e.g., the first output 146, the second output 148, the outputs 372 of the divider 370, the output 610 of the PLL 606, or variants herein). The first input (e.g., the first input 142 or variants herein) of the CDR circuitry is coupled to the output (e.g., the output 126 or variants herein) of the equalizer circuitry. The receiver also includes sampler circuitry (e.g., the sampler circuitry 150 or variants herein) having a first input (e.g., the first input 152 or variants herein), a second input (e.g., the second input 154, the third input 156, or variants herein), and an output (e.g., the first output 158, the second output 160, or variants herein). The first input (e.g., the first input 152 or variants herein) of the sampler circuitry is coupled to the output (e.g., the output 126 or variants herein) of the equalizer circuitry. The second input (e.g., the second input 154, the third input 156, or variants herein) of the sampler circuitry coupled to the clock output (e.g., the clock output 148 or variants herein) of the CDR circuitry. The receiver also includes adaptation circuitry (e.g., the adaptation circuit 128 or variants herein) having an input (e.g., the first input 130, the second input 132, or variants herein), a first output (e.g., the first output 134 or variants herein), a second output (the second output 136 or variants herein), and a third output (e.g., the third output 138 or variants herein). The input (e.g., the first input 130, the second input 132, or variants herein) of the adaptation circuitry is coupled to the output (e.g., the first output 158, the second output 160, or variants herein) of the sampler circuitry. The first output (e.g., the first output 134 or variants herein) of the adaptation circuitry is coupled to the fourth input (e.g., the fourth input 122 or variants herein) of the equalizer circuitry. The second output (e.g., the second output 136 or variants herein) of the adaptation circuitry is coupled to the fifth input (e.g., the fifth input 124 or variants herein) of the equalizer circuitry. The receiver also includes clock adjustment circuitry (e.g., the clock adjustment circuitry 162 or variants herein) having a first input (e.g., the second input 166, the third input 168, or variants herein), a second input (e.g., the first input 164 or variants herein), and an output (e.g., the first output 170, the second output 172, or variants herein). The first input (e.g., the second input 166, the third input 168, or variants herein) of the clock adjustment circuitry is coupled to the clock output (e.g., the first output 146, the second output 148, or variants herein) of the CDR circuitry. The second input (e.g., the first input 164 or variants herein) of the clock adjustment circuitry is coupled to the third output (e.g., the third output 138 or variants herein) of the adaptation circuitry.

In some examples, the output (e.g., the first output 170 or variants herein) of the clock adjustment circuitry is coupled to the second input (e.g., the second input 144 or variants herein) of the CDR circuitry. In some examples, the clock adjustment circuitry includes a delay circuit (e.g., the first delay circuit 382 or the second delay circuit 388 herein) having an input (e.g., the input 384 or the input 390 herein), a control input (the control input 385 or the control input 391 herein), and an output (e.g., the output 386 or the output 392 herein). The input (e.g., the input 384 or the input 390 herein) of the delay circuit is coupled to the first input (e.g., the second input 166, the third input 168, or variants herein) of the clock adjustment circuitry. The control input (e.g., the control input 385 or the control input 391 herein) of the delay circuit is coupled to the second input (e.g., the first input 164 or variants herein) of the clock adjustment circuitry. The output (e.g., the output 386 or the output 392 herein) of the delay circuit is coupled to the output (e.g., the first output 170 or variants herein) of the clock adjustment circuitry.

In some examples, the output (e.g., the first output 170 or variants herein) of the clock adjustment circuitry is a first output of clock adjustment circuitry, the clock adjustment circuitry has a second output (e.g., the second output 172 or variants herein) coupled to the second input (e.g., the third input 156 or variants herein) of the sampler circuitry, the delay circuit (e.g., the first delay circuit 382 or the second delay circuit 388 herein) is a first delay circuit, and the clock adjustment circuitry includes a second delay circuit (e.g., the delay circuit 408 herein) having an input (e.g., the input 410 herein), a control input (e.g., the control input 412 herein), and an output (e.g., the output 414 herein). The input (e.g., the input 410 herein) of the second delay circuit is coupled to the first input (e.g., the third input 168 herein) of the clock adjustment circuitry. The output (e.g., the output 414 herein) of the second delay circuit is coupled to the second output (e.g., the second output 172 or variants herein) of the clock adjustment circuitry.

In some examples, the output (e.g., the second output 172 or variants herein) of the clock adjustment circuitry is coupled to the second input (e.g., the second input 154, the third input 156, variants herein) of the sampler circuitry. In some examples, the clock adjustment circuitry includes a first delay circuit (e.g., the first delay circuit 382 or the second delay circuit 388 herein) and a second delay circuit (e.g., the third delay circuit 388 herein). The first delay circuit is configured to provide a CDR clock signal (e.g., delayed versions of the I or Q clocks herein) based on a clock signal (e.g., the I or Q clocks herein) at the clock output (e.g., the first output 146 or the second output 148 herein). The second delay circuit (e.g., the third delay circuit 408 herein) is configured to provide a sampling clock signal (e.g., a delayed version of the I clock herein) based on the clock signal (e.g., the I clock herein) at the clock output (e.g., the second output 148 herein). The CDR clock signal is delayed more than the sampling clock signal relative to the clock signal at the clock output.

In some examples, the clock adjustment circuitry includes a combine circuit (e.g., the combine circuit 503 herein) having a first input (e.g., the first input 504 herein), a second input (e.g., the second input 506 herein), and an output (e.g., the output 508 herein). The combine circuit (e.g., the combine circuit 503 herein) is configured to: receive a clock signal (e.g., the I clock or $V_{CK}$ herein) from the clock output (e.g., the second output 148 herein) at its first input; receive an offset voltage (e.g., $V_{OS}$ herein) at its second input; and provide a sampling clock signal (e.g., $V_{CK}+V_{OS}$) at its output responsive to the clock signal and the offset voltage.

In some examples, the clock adjustment circuitry includes a PI circuit (e.g., the second PI circuit 648 herein) having a first input (e.g., the second input 652 herein), a second input (e.g., the first input 650 herein), and an output (e.g., the output 654 herein). The PI circuit (e.g., the second PI circuit 648 herein) is configured to: receive a clock signal from the clock output (e.g., the clock signal at the output 610 of the PLL 606 herein) at its first input (e.g., the second input 652 herein); receive a control code at its second input (e.g., the first input 650 herein); and provide a sampling clock signal at its output (e.g., the output 654 herein) responsive to the clock signal and the control code.

In some examples, the CDR circuitry includes a first PI circuit (e.g., the first PI circuit 634 herein), the PI circuit of the clock adjustment circuitry is a second PI circuitry (e.g., the second PI circuit 648 herein), and the clock adjustment circuitry includes a combine circuit (e.g., the combine circuit 656 herein) having a first input (e.g., the first input 658 herein), a second input (e.g., the second input 660 herein), and an output (e.g., the output 662 herein). The combine circuit is configured to: receive a first control code related to the first PI circuit at its first input (e.g., the first input 658 herein); receive an offset at its second input (e.g., the second input 660 herein); and provide the control code for the second PI circuitry at its output (e.g., the output 662 herein) responsive to the first control code and the offset.

In some examples, the adaptation circuitry (e.g., the adaptation circuitry 128 or variants herein) includes a clock adjustment controller (e.g., the clock adjustment controller 334 herein) having an input (e.g., the input 335 herein) and an output (e.g., the output 336 or the output 416 herein). The clock adjustment controller (e.g., the clock adjustment controller 334 herein) is configured to: receive a CTLE index result; and provide a clock adjustment control signal to the clock adjustment circuitry responsive to the CTLE index result. In some examples, the clock adjustment controller (e.g., the clock adjustment controller 334 herein) uses an LUT to provide the clock adjustment control signal responsive to the CTLE index result. In some examples, the clock adjustment controller uses a DAC (e.g., the DAC 510 herein) to provide the clock adjustment control signal responsive to the CTLE index result.

In some examples, a system includes: a transmitter (e.g., the transmitter 102 herein); and a receiver (e.g., the receiver 112 or variants herein) in communication with the transmitter via a channel (e.g., the channel 106 herein). The receiver includes equalizer circuitry (e.g., the equalizer circuitry 114 or variants herein) having a first input (e.g., the first input 116 or variants herein), a second input (e.g., the second input 118 or variants herein), a third input (e.g., the third input 120 or variants herein), a fourth input (e.g., the fourth input 122 or variants herein), a fifth input (e.g., the fifth input 124 or variants herein), and an output (e.g., the output 126 or variants herein). The receiver also includes CDR circuitry (e.g., the CDR circuitry 140 or variants herein) having a first input (e.g., the first input 142 or variants herein), a second input (e.g., the second input 144 or variants herein), and a clock output (e.g., the first output 146, the second output 148, the outputs 372 of the divider 370, the output 610 of the PLL 606, or variants herein). The first input (e.g., the first input 142 or variants herein) of the CDR circuitry is coupled to the output (e.g., the output 126 or variants herein) of the equalizer circuitry. The receiver also includes sampler circuitry (e.g., the sampler circuitry 150 or variants herein) having a first input (e.g., the first input 152 or variants herein), a second input (e.g., the second input 154, the third input 156, or variants herein), and an output (e.g., the first output 158, the second output 160, or variants herein). The first input (e.g., the first input 152 or variants herein) of the sampler circuitry is coupled to the output (e.g., the output 126 or variants herein) of the equalizer circuitry. The second input (e.g., the second input 154, the third input 156, or variants herein) of the sampler circuitry coupled to the clock output (e.g., the clock output 148 or variants herein) of the CDR circuitry. The receiver also includes adaptation circuitry (e.g., the adaptation circuit 128 or variants herein) having an input (e.g., the first input 130, the second input 132, or variants herein), a first output (e.g., the first output 134 or variants herein), a second output (the second output 136 or variants herein), and a third output (e.g., the third output 138 or variants herein). The input (e.g., the first input 130, the second input 132, or variants herein) of the adaptation circuitry is coupled to the output (e.g., the first output 158, the second output 160, or variants herein) of the sampler circuitry. The first output (e.g., the first output 134 or variants herein) of the adaptation circuitry is coupled to the fourth input (e.g., the fourth input 122 or variants herein) of the equalizer circuitry. The second output (e.g., the second output 136 or variants herein) of the adaptation circuitry is coupled to the fifth input (e.g., the fifth input 124 or variants herein) of the equalizer circuitry. The receiver also includes clock adjustment circuitry (e.g., the clock adjustment circuitry 162 or variants herein) having a first input (e.g., the second input 166, the third input 168, or variants herein), a second input (e.g., the first input 164 or variants herein), and an output (e.g., the first output 170, the second output 172, or variants herein). The first input (e.g., the second input 166, the third input 168, or variants herein) of the clock adjustment circuitry is coupled to the clock output (e.g., the first output 146, the second output 148, or variants herein) of the CDR circuitry. The second input (e.g., the first input 164 or variants herein) of the clock adjustment circuitry is coupled to the third output (e.g., the third output 138 or variants herein) of the adaptation circuitry.

In some examples, the clock adjustment circuitry (e.g., the clock adjustment circuit 162 or variants herein) is configured to: receive a clock signal (e.g., the I or Q clocks herein) from the clock output (e.g., the first output 146 or the second output 148 herein) at its first input (e.g., the second input 166, the third input 168, or variants herein); receive a clock adjustment control signal at its second input (e.g., the first input 164 or variants herein); and provide a delayed version of the clock signal at its output (e.g., the first output 170 or variants herein) responsive to the clock signal and the clock adjustment control signal. In some examples, the clock adjustment circuitry is configured to: receive a clock signal e.g., the I clock or $V_{CK}$ herein) from the clock output (e.g., the second output 148 herein) at its first input (e.g., the first input 501 herein); receive a clock adjustment control signal (e.g., $V_{OS}$ herein) at its second input (e.g., the second input 502 herein); and provide a voltage offset version (e.g., $V_{CK}+V_{OS}$ herein) of the clock signal at its output (e.g., the output 509 herein) responsive to the clock signal and the clock adjustment control signal. In some examples, the clock adjustment circuitry is configured to: receive a clock signal (e.g., the clock signal at the output 610 of the PLL 606 herein) from the clock output at its first input (e.g., the first input 640 herein); receive a clock adjustment control signal at its second input (e.g., the second input 642 or the third input 644 herein); and provide a phase-shifted version of the clock signal at its output (e.g., the output 646 herein) responsive to the clock signal and the clock adjustment control signal.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") such as an NFET or a PFET, a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control terminal and its first and second terminals. In the context of a FET, the control terminal is the gate, and the first and second terminals are the drain and source. In the context of a BJT, the control terminal is the base, and the first and second terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

The invention claimed is:

1. A receiver comprising:
equalizer circuitry having a first input, a second input, a third input, a fourth input, a fifth input, and an output;
clock and data recovery (CDR) circuitry having a first input, a second input, and a clock output, the first input of the CDR circuitry coupled to the output of the equalizer circuitry;
sampler circuitry having a first input, a second input, and an output, the first input of the sampler circuitry coupled to the output of the equalizer circuitry, the second input of the sampler circuitry coupled to the clock output of the CDR circuitry;
adaptation circuitry having an input, a first output, a second output, and a third output, the input of the adaptation circuitry coupled to the output of the sampler circuitry, the first output of the adaptation circuitry coupled to the fourth input of the equalizer circuitry, the second output of the adaptation circuitry coupled to the fifth input of the equalizer circuitry;
clock adjustment circuitry having a first input, a second input, and an output, the first input of the clock adjustment circuitry coupled to the clock output of the CDR circuitry, the second input of the clock adjustment circuitry coupled to the third output of the adaptation circuitry;
wherein the output of the clock adjustment circuitry is coupled to the second input of the CDR circuitry; and
wherein the clock adjustment circuitry includes a delay circuit having an input, a control input, and an output, the input of the delay circuit coupled to the first input of the clock adjustment circuitry, the control input of the delay circuit coupled to the second input of the clock adjustment circuitry, and the output of the delay circuit coupled to the output of the clock adjustment circuitry.

2. The receiver of claim 1, wherein the output of the clock adjustment circuitry is a first output of clock adjustment circuitry, the clock adjustment circuitry has a second output coupled to the second input of the sampler circuitry, the delay circuit is a first delay circuit, and the clock adjustment circuitry includes a second delay circuit having an input, a control input, and an output, the input of the second delay circuit coupled to the first input of the clock adjustment circuitry, and the output of the second delay circuit coupled to the second output of the clock adjustment circuitry.

3. The receiver of claim 1, wherein the output of the clock adjustment circuitry is coupled to the second input of the sampler circuitry and wherein the clock adjustment circuitry includes a first delay circuit and a second delay circuit, the first delay circuit configured to provide a CDR clock signal based on a clock signal at the clock output, the second delay circuit configured to provide a sampling clock signal based on the clock signal at the clock output, and the CDR clock signal delayed more than the sampling clock signal relative to the clock signal at the clock output.

4. A receiver comprising:
equalizer circuitry having a first input, a second input, a third input, a fourth input, a fifth input, and an output;
clock and data recovery (CDR) circuitry having a first input, a second input, and a clock output, the first input of the CDR circuitry coupled to the output of the equalizer circuitry;
sampler circuitry having a first input, a second input, and an output, the first input of the sampler circuitry coupled to the output of the equalizer circuitry, the second input of the sampler circuitry coupled to the clock output of the CDR circuitry;
adaptation circuitry having an input, a first output, a second output, and a third output, the input of the adaptation circuitry coupled to the output of the sampler circuitry, the first output of the adaptation circuitry coupled to the fourth input of the equalizer circuitry, the second output of the adaptation circuitry coupled to the fifth input of the equalizer circuitry; and
clock adjustment circuitry having a first input, a second input, and an output, the first input of the clock adjustment circuitry coupled to the clock output of the CDR circuitry, the second input of the clock adjustment circuitry coupled to the third output of the adaptation circuitry;
wherein the adaptation circuitry includes a clock adjustment controller having an input and an output, the clock adjustment controller configured to: receive a continuous-time linear equalizer (CTLE) index result; and provide a clock adjustment control signal to the clock adjustment circuitry responsive to the CTLE index result.

5. A system comprising:
a transmitter; and
a receiver in communication with the transmitter via a channel, the receiver including:
  equalizer circuitry having a first input, a second input, a third input, a fourth input, a fifth input, and an output;
  clock and data recovery (CDR) circuitry having a first input, a second input, and a clock output, the first input of the CDR circuitry coupled to the output of the equalizer circuitry;
  sampler circuitry having a first input, a second input, and an output, the first input of the sampler circuitry coupled to the output of the equalizer circuitry, the second input of the sampler circuitry coupled to the clock output of the CDR circuitry;
  adaptation circuitry having an input, a first output, a second output, and a third output, the input of the adaptation circuitry coupled to the output of the sampler circuitry, the first output of the adaptation circuitry coupled to the fourth input of the equalizer circuitry, the second output of the adaptation circuitry coupled to the fifth input of the equalizer circuitry; and
clock adjustment circuitry having a first input, a second input, and an output, the first input of the clock adjustment circuitry coupled to the clock output of the CDR circuitry, the second input of the clock adjustment circuitry coupled to the third output of the adaptation circuitry;
wherein the clock adjustment circuitry is configured to:
  receive a clock signal from the clock output at its first input;
  receive a clock adjustment control signal at its second input; and
  provide a delayed version of the clock signal at its output responsive to the clock signal and the clock adjustment control signal.

6. A system comprising:
a transmitter; and
a receiver in communication with the transmitter via a channel, the receiver including:
  equalizer circuitry having a first input, a second input, a third input, a fourth input, a fifth input, and an output;
  clock and data recovery (CDR) circuitry having a first input, a second input, and a clock output, the first input of the CDR circuitry coupled to the output of the equalizer circuitry;
  sampler circuitry having a first input, a second input, and an output, the first input of the sampler circuitry coupled to the output of the equalizer circuitry, the second input of the sampler circuitry coupled to the clock output of the CDR circuitry;
  adaptation circuitry having an input, a first output, a second output, and a third output, the input of the adaptation circuitry coupled to the output of the sampler circuitry, the first output of the adaptation circuitry coupled to the fourth input of the equalizer circuitry, the second output of the adaptation circuitry coupled to the fifth input of the equalizer circuitry; and
clock adjustment circuitry having a first input, a second input, and an output, the first input of the clock adjustment circuitry coupled to the clock output of the CDR circuitry, the second input of the clock adjustment circuitry coupled to the third output of the adaptation circuitry;
wherein the clock adjustment circuitry is configured to:
  receive a clock signal from the clock output at its first input;
  receive a clock adjustment control signal at its second input; and
  provide a voltage offset version of the clock signal at its output responsive to the clock signal and the clock adjustment control signal.

7. A system comprising:
a transmitter; and
a receiver in communication with the transmitter via a channel, the receiver including:
  equalizer circuitry having a first input, a second input, a third input, a fourth input, a fifth input, and an output;
  clock and data recovery (CDR) circuitry having a first input, a second input, and a clock output, the first input of the CDR circuitry coupled to the output of the equalizer circuitry;
  sampler circuitry having a first input, a second input, and an output, the first input of the sampler circuitry coupled to the output of the equalizer circuitry, the second input of the sampler circuitry coupled to the clock output of the CDR circuitry;
  adaptation circuitry having an input, a first output, a second output, and a third output, the input of the adaptation circuitry coupled to the output of the sampler circuitry, the first output of the adaptation circuitry coupled to the fourth input of the equalizer circuitry, the second output of the adaptation circuitry coupled to the fifth input of the equalizer circuitry; and
clock adjustment circuitry having a first input, a second input, and an output, the first input of the clock adjustment circuitry coupled to the clock output of the CDR circuitry, the second input of the clock adjustment circuitry coupled to the third output of the adaptation circuitry;
wherein the clock adjustment circuitry is configured to:
  receive a clock signal from the clock output at its first input;
  receive a clock adjustment control signal at its second input; and provide a phase-shifted version of the clock signal at its output responsive to the clock signal and the clock adjustment control signal.

8. A method comprising:

receiving data via a channel;

performing equalization operations on received data, the equalization operations resulting in equalization results;

performing sampling operations responsive to the equalization results, the sampling operations resulting in data samples and error samples;

performing adaptation operations responsive to the data samples and the error samples, the adaptation operations resulting in a clock adjustment control signal;

adjusting a sampling clock signal relative to a CDR clock signal responsive to the clock adjustment control signal;

wherein adjusting the sampling clock signal relative to the CDR clock signal responsive to the clock adjustment control signal includes adjusting a voltage of the sampling clock signal relative to a voltage of the CDR clock signal responsive to the clock adjustment control signal.

* * * * *